US012749609B2

(12) United States Patent
Chen et al.

(10) Patent No.: US 12,749,609 B2
(45) Date of Patent: Sep. 29, 2026

(54) LARGE DZYALOSHINSKII-MORIYA INTERACTION AND PERPENDICULAR MAGNETIC ANISOTROPY INDUCED BY CHEMISORBED SPECIES ON FERROMAGNETS

(71) Applicants: Georgetown University, Washington, DC (US); The Regents of the University of California, Oakland, CA (US)

(72) Inventors: Gong Chen, El Cerrito, CA (US); Kai Liu, Falls Church, VA (US); Andreas Schmid, Berkeley, CA (US)

(73) Assignees: Georgetown University, Washington, DC (US); The Regents of the University of California, Oakland, CA (US)

( * ) Notice: Subject to any disclaimer, the term of this patent is extended or adjusted under 35 U.S.C. 154(b) by 1149 days.

(21) Appl. No.: 17/636,963

(22) PCT Filed: Aug. 13, 2020

(86) PCT No.: PCT/US2020/046125
§ 371 (c)(1),
(2) Date: Feb. 21, 2022

(87) PCT Pub. No.: WO2021/034594
PCT Pub. Date: Feb. 25, 2021

(65) Prior Publication Data

US 2022/0406508 A1 Dec. 22, 2022

Related U.S. Application Data

(60) Provisional application No. 62/888,691, filed on Aug. 19, 2019.

(51) Int. Cl.
*H01F 10/32* (2006.01)

(52) U.S. Cl.
CPC ................................ *H01F 10/3236* (2013.01)

(58) Field of Classification Search
CPC . H01F 10/3236; H01F 10/3281; H01F 41/303
See application file for complete search history.

(56) References Cited

U.S. PATENT DOCUMENTS

2018/0240972 A1 8/2018 Gilbert et al.

OTHER PUBLICATIONS

Zhang, Q., Fu, H., You, C. et al. Perpendicular Magnetic Anisotropy and Hydrogenation-Induced Magnetic Change of Ta/Pd/CoFeMnSi/MgO/Pd Multilayers. Nanoscale Res Lett 13, 222 (2018). (Year: 2018).*

(Continued)

*Primary Examiner* — Brigitte A Paterson
(74) *Attorney, Agent, or Firm* — Smith Gambrell & Russell LLP

(57) ABSTRACT

Embodiments may provide the realization of strong Dzyaloshinskii-Moriya Interaction (DMI) and perpendicular magnetic anisotropy (PMA) induced by chemisorbed species on a ferromagnetic layer. For example, in an embodiment, an apparatus for generating a Dzyaloshinskii-Moriya interaction may comprise a ferromagnet comprising a single layer or multi-layers of materials made of metal, oxide or other types of magnetic films, and a substance chemisorbed on a surface of the ferromagnet to induce the Dzyaloshinskii-Moriya interaction or the perpendicular magnetic anisotropy at the interface between chemisorbed species and ferromagnet. These induced effects may be used to manipulate spin textures such as switching of domain wall chirality and writing/deleting of magnetic skyrmions, which are relevant for spintronics, magneto-ionics as well as gas sensing.

8 Claims, 12 Drawing Sheets

FIG. 11

(56) References Cited

OTHER PUBLICATIONS

Yang, H., Chen, G., Cotta, A.A.C. et al. Significant Dzyaloshinskii-Moriya interaction at graphene-ferromagnet interfaces due to the Rashba effect. Nature Mater 17, 605-609 (2018). (Year: 2018).*
Sergey M. Kozlov, Francesc Vifies, and Andreas Gorling "Bonding Mechanisms of Graphene on Metal Surfaces". The Journal of Physical Chemistry C 2012 116 (13) (Year: 2013).*
Orbital Redistribution Enhanced Perpendicular Magnetic Anisotropy of CoFe3N Nitrides by Adsorbing Organic Molecules Zirun Li, Wenbo Mi, and Haili Bai ACS Applied Materials & Interfaces 2018 10 (19), 16674-16680 (Year: 2018).*
International Search Report/Written Opinion released by the U.S. Patent & Trademark Office as International Search Authority for corresponding application No. PCT/US2020/046125 on Mar. 24, 2021; 15 pages.
Wu, D. et al., "Perpendicular Magnetic Anisotrophy and Magnetization Dynamics in Oxidized CoFeAl Films" Sci. Rep.; Published Jul. 20, 2015, retrieved from the internet on Jan. 24, 2021; 9 pages.
Bairagi, K. et al., "Tuning the Magnetic Anisotrophy at a Molecule-Metal Interface" PRL; Published Jun. 19, 2015, retrieved from the internet on Jan. 24, 2021; 5 pages.
Zhang, X. et al., "Interface Effects on Perpendicular Magnetic Anisotrophy for Molecular-Capped Cobalt Ultrathin Films" Appl. Phys. Lett.; Published Oct. 19, 2011, retrieved from the internet on Jan. 24, 2021; 4 pages.
Zhang, Q. et al., "Perpendicular Magnetic Anisotrophy and Hydrogenation-Induced Magnetic Change of Ta/Pd/CoFeMnSi/MgO/Pd Multilayers" Nanoscale Res. Lett.; Published Jul. 25, 2018, retrieved from the internet Jan. 24, 2021; 6 pages.
Belabbes, A. et al., "Oxygen-Enabled Control of Dzyaloshinskii-Moriya Interaction in Ultra-thin Magnetic Films" Sci. Rep.; Published Apr. 22, 2016, retrieved from the internet Jan. 22, 2021; 9 pages.
Mulkers, J. et al., "Effects of Spatially Engineered Dzyaloshinskii-Moriya Interaction in Ferromagnetic Films" Phys. Rev. B; Published Apr. 3, 2017, retrieved from the internet Jan. 20, 2021; 8 pages.
Yang, H. et al., "Significant Dzyaloshinskii-Moriya Interaction at Graphene-Ferromagnetic Interfaces due to Rashba-Effect" Published May 28, 2018, retrieved from the internet Jan. 21, 2021; 22 pages.
Cao, A. et al., "Tuning the Dzyaloshinskii-Moriya Interaction in Pt/Co/MgO heterostructures through MgO thickness" Published May 23, 2018, retrieved from the internet Jan. 22, 2021; 16 pages.

* cited by examiner

LARGE DZYALOSHINSKII-MORIYA INTERACTION AND PERPENDICULAR MAGNETIC ANISOTROPY INDUCED BY CHEMISORBED SPECIES ON FERROMAGNETS

CROSS-REFERENCE TO RELATED APPLICATIONS

This application claims the benefit of U.S. Provisional Application No. 62/888,691, filed Aug. 19, 2019, the contents of which are incorporated herein in their entirety.

STATEMENT REGARDING FEDERALLY SPONSORED RESEARCH

This invention was made with government support under Grant Numbers DMR-1610060 and DMR-1905468, awarded by the National Science Foundation; Grant Number MRP-17-454963 awarded by the University of California Office of the President Multi-campus Research Programs; Contract Number DE-AC02-05CH11231 awarded by the Office of Science, Office of Basic Energy Sciences, U.S. Department of Energy; and Grant Number 2018-NE-2861, awarded by nCORE, a Semiconductor Research Corporation program, sponsored by the National Institute of Standards and Technology (NIST). The government has certain rights in the invention.

BACKGROUND

The present invention relates to the realization of a strong Dzyaloshinskii-Moriya Interaction (DMI) and perpendicular magnetic anisotropy (PMA) induced by chemisorbed species on a ferromagnetic layer.

The Dzyaloshinskii-Moriya interaction (DMI) is a spin-spin interaction that has finite values only in systems lacking inversion symmetry. Dzyaloshinskii proposed that the combination of low symmetry and spin-orbit coupling gives rise to an antisymmetric exchange interaction, and Moriya introduced how to calculate the antisymmetric exchange interaction for localized magnetic systems in a microscopic model. This picture was later used to successfully explain helical spin order as well as skyrmion lattices in MnSi and FeGe crystals lacking inversion symmetry. In addition, Fert and Levy proposed a DMI mechanism that involves magnetic and non-magnetic sites in spin glasses, which was extended to thin film surfaces and interfaces where inversion symmetry breaks along the surface normal direction.

This DMI mechanism may be invoked to explain the stability of preferred chirality in a large variety of systems featuring non-collinear spin textures, such as spin spirals, skyrmions or chiral domain walls (DWs). Its energy term $-D_{ij}\cdot(S_i \times S_j)$ indicates that the sign of the DMI vector $D_{ij}$ determines the chirality of spin textures, i.e. being right- or left-handed, and the interplay between the magnitude of DMI and other magnetic interactions influences the size of spin textures. Intensive experimental and theoretical efforts have been made to explore the material dependence of the interfacial DMI and to exploit the flexibility of interface choices and stacking orders to enhance the effective DMI, with the goal of optimizing thin film and multilayer systems for the design of spin-orbitronic devices based on chiral spin textures.

Experimentally, most work on interfacial DMI systems has focused on magnetic layers adjacent to heavy metals, such as hafnium, tantalum, tungsten, iridium, platinum, palladium or ruthenium, where large differences of the DMI magnitude among those elements were attributed to the distinct degree of hybridization between 5d and 3d orbitals near the Fermi level. On the other hand, it is fundamentally interesting to explore effects of elements with low atomic number on the DMI. For instance, a significant magnitude of the DMI was observed at the Co/graphene interface and was attributed to the Rashba effect. The DMI at the Fe/oxygen interface has also been theoretically predicted. However, experimental measurement of the oxygen induced DMI remains unclear, partly due to the necessity of ultrahigh vacuum environment, which is not compatible with some commonly used approaches to quantify the DMI.

Accordingly, a need arises for improved techniques for the realization of strong Dzyaloshinskii-Moriya Interaction (DMI) and perpendicular magnetic anisotropy (PMA) induced by chemisorbed species on a ferromagnetic layer.

SUMMARY

Embodiments may provide the realization of strong Dzyaloshinskii-Moriya Interaction (DMI) and perpendicular magnetic anisotropy (PMA) induced by chemisorbed species on a ferromagnetic layer. In the case of chemisorbed oxygen on ferromagnets, the sign of this DMI and its surprisingly large magnitude—despite the low atomic number of oxygen—are derived by examining the oxygen coverage dependent evolution of domain wall chirality. The oxygen induced DMI may be greater than the DMI induced at interfaces with many transition metals; it is sufficiently large to enable, e.g., the tailoring of skyrmion's winding number via oxygen chemisorption. This result extends the understanding of the DMI and supports chemisorption related design of spin-orbitronics devices.

For example, in an embodiment, an apparatus for generating a Dzyaloshinskii-Moriya interaction may comprise a ferromagnet comprising a single layer or multi-layers of materials made of metal, oxide or other types of magnetic films, and a substance chemisorbed on a surface of the ferromagnet to induce the Dzyaloshinskii-Moriya interaction at the interface between chemisorbed species and ferromagnet.

In embodiments, the Dzyaloshinskii-Moriya interaction may be controlled based on a thickness of at least one layer of metal. The Dzyaloshinskii-Moriya interaction may be controlled based on a substance chemisorbed on the surface of the ferromagnet. The Dzyaloshinskii-Moriya interaction may be controlled based on a thickness of the substance chemisorbed on the surface of the ferromagnet. The layers may be selected from transition metals, alkali metals, and lanthanides, including but not limited to Manganese, Iron, Cobalt, Nickel, Molybdenum, Ruthenium, Rhodium, Palladium, Cesium, Hafnium, Tantalum, Tungsten, Rhenium, Iridium, Platinum, Gadolinium, Terbium, Dysprosium, Holmium, and their alloys, or selected from a group of other non-metallic materials, including but not limited to ferrites, garnets, rare-earth oxides, Heusler alloys, $CrO_2$, graphene, $CrI_3$, and $Cr_2Ge_2Te_6$. The substance may be selected from a group of substances comprising $O_2$, $H_2$, $N_2$, $F_2$, $NH_3$, $H_2O$, $CH_3$, $CH_4$, CO, $CO_2$, fullerene ($C_{60}$ and $C_{70}$), bathocuproine (BCP), Tris(8-hydroxyquinoline)aluminum(III), and their ionic species such as $O^{2-}$, $H^+$, $N^{3-}$, $F^-$ and $OH^-$. The Dzyaloshinskii-Moriya interaction may be controlled so as to generate a skyrmion by changing a coverage of the chemisorbed substance. The substance coverage thickness may be in a range of about 0 to 100 nm.

In an embodiment, an apparatus for generating a Dzyaloshinskii-Moriya interaction may comprise a ferromagnet comprising Ni/Co/Pd/W multilayers or Ni/Co/W/Pd multilayers, and a substance chemisorbed on a surface Ni layer of the ferromagnet to induce the Dzyaloshinskii-Moriya interaction at the interface between the chemisorbed substance and ferromagnet, wherein the Dzyaloshinskii-Moriya interaction is controlled based on a thickness of a Pd layer or W layer.

In embodiments, the Dzyaloshinskii-Moriya interaction may be controlled based on the substance chemisorbed on the surface of the ferromagnet. The Dzyaloshinskii-Moriya interaction may be controlled based on a thickness of the substance chemisorbed on the surface of the ferromagnet. The substance may be selected from a group of substances comprising $O_2$, $H_2$, $N_2$, $F_2$, $NH_3$, $H_2O$, $CH_3$, $CH_4$, CO, $CO_2$, fullerene ($C_{60}$ and $C_{70}$), bathocuproine, Tris(8-hydroxyquinoline)aluminum(III), and their ionic species such as $O^{2-}$, $H^+$, $N^{3-}$, $F^-$ and $OH^-$. The Dzyaloshinskii-Moriya interaction may be controlled so as to generate a skyrmion by introducing chemisorbed oxygen on top of ferromagnetic layers. A coverage of the oxygen coverage may determine the strength of the Dzyaloshinskii-Moriya interaction. The oxygen coverage thickness is in a range of about 0 to 100 nm.

In an embodiment, an apparatus for generating a perpendicular magnetic anisotropy may comprise a substance chemisorbed on a surface of a ferromagnet to induce perpendicular magnetic anisotropy at an interface between the chemisorbed substance and the ferromagnet.

In embodiments, the perpendicular magnetic anisotropy may be controlled based on a substance chemisorbed on the surface of the ferromagnet. The perpendicular magnetic anisotropy may be controlled based on a thickness of substance chemisorbed on the surface of the ferromagnet. The substance chemisorbed on the surface of the ferromagnet may further induce a Dzyaloshinskii-Moriya interaction at an interface between chemisorbed substance and the ferromagnet. The substance may be selected from a group of substances comprising bathocuproine, Tris(8-hydroxyquinoline)aluminum(III), and fullerene ($C_{60}$ and $C_{70}$).

In an embodiment, a method for generating a Dzyaloshinskii-Moriya interaction may comprise providing a ferromagnet comprising a single layer or multi-layers of materials made of metal, oxide or other types of magnetic films, and chemisorbing a substance on a surface of the ferromagnet to induce the Dzyaloshinskii-Moriya interaction at the interface between chemisorbed species and ferromagnet.

In embodiments, the method may further comprise controlling the Dzyaloshinskii-Moriya interaction based on a thickness of at least one layer of film. The method may further comprise controlling the Dzyaloshinskii-Moriya interaction based on a substance chemisorbed on the surface of the ferromagnet. The method may further comprise controlling the Dzyaloshinskii-Moriya interaction based on a thickness of the substance chemisorbed on the surface of the ferromagnet. The layers of the ferromagnet stack may be selected from transition metals, alkali metals, and lanthanides, including but not limited to Manganese, Iron, Cobalt, Nickel, Molybdenum, Ruthenium, Rhodium, Palladium, Cesium, Hafnium, Tantalum, Tungsten, Rhenium, Iridium, Platinum, Gadolinium, Terbium, Dysprosium, Holmium, and their alloys, or selected from a group of other non-metallic materials, including but not limited to ferrites, garnets, rare-earth oxides, Heusler alloys, $CrO_2$, graphene, $CrI_3$, and $Cr_2Ge_2Te_6$. The substance may be selected from a group of substances comprising $O_2$, $H_2$, $N_2$, $F_2$, $NH_3$, $H_2O$, $CH_3$, $CH_4$, CO, $CO_2$, fullerene ($C_{60}$ and $C_{70}$), bathocuproine, Tris(8-hydroxyquinoline)aluminum(III), and their ionic species such as $O^{2-}$, $H^+$, $N^{3-}$, $F^-$ and $OH^-$. The method may further comprise controlling the Dzyaloshinskii-Moriya interaction so as to generate a skyrmion by changing a coverage of the chemisorbed substance. The substance coverage thickness may be in a range of about 0 to 100 nm.

In an embodiment, a method for generating a Dzyaloshinskii-Moriya interaction may comprise providing a ferromagnet comprising Ni/Co/Pd/W multilayers or Ni/Co/W/Pd multilayers, chemisorbing a substance on a surface Ni layer of the ferromagnet to induce the Dzyaloshinskii-Moriya interaction at the interface between the chemisorbed substance and ferromagnet, and controlling the Dzyaloshinskii-Moriya interaction based on a thickness of a Pd layer or W layer.

In embodiments, the method may further comprise controlling the Dzyaloshinskii-Moriya interaction based on the substance chemisorbed on the surface of the ferromagnet. The method may further comprise controlling the Dzyaloshinskii-Moriya interaction based on a thickness of the substance chemisorbed on the surface of the ferromagnet. The substance may be selected from a group of substances comprising $O_2$, $H_2$, $N_2$, $F_2$, $NH_3$, $H_2O$, $CH_3$, $CH_4$, CO, $CO_2$, fullerene ($C_{60}$ and $C_{70}$), bathocuproine, Tris(8-hydroxyquinoline)aluminum(III), and their ionic species such as $O^{2-}$, $H^+$, $N^{3-}$, $F^-$ and $OH^-$. The method may further comprise controlling the Dzyaloshinskii-Moriya interaction so as to generate a skyrmion by introducing chemisorbed oxygen on top of ferromagnetic layers. A coverage of the oxygen coverage may determine the strength of the Dzyaloshinskii-Moriya interaction. The oxygen coverage thickness may be in a range of about 0 to 100 nm.

In an embodiment, a method for generating a perpendicular magnetic anisotropy may comprise chemisorbing a substance on a surface of a ferromagnet to induce perpendicular magnetic anisotropy at an interface between the chemisorbed substance and the ferromagnet.

In embodiments, the method may further comprise controlling the perpendicular magnetic anisotropy based on a substance chemisorbed on the surface of the ferromagnet. The method may further comprise controlling the perpendicular magnetic anisotropy based on a thickness of substance chemisorbed on the surface of the ferromagnet. The substance chemisorbed on the surface of the ferromagnet may further induce a Dzyaloshinskii-Moriya interaction at an interface between chemisorbed substance and the ferromagnet. The substance may be selected from a group of substance comprising bathocuproine, Tris(8-hydroxyquinoline)aluminum(III), and fullerene (C60 and $C_{70}$).

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
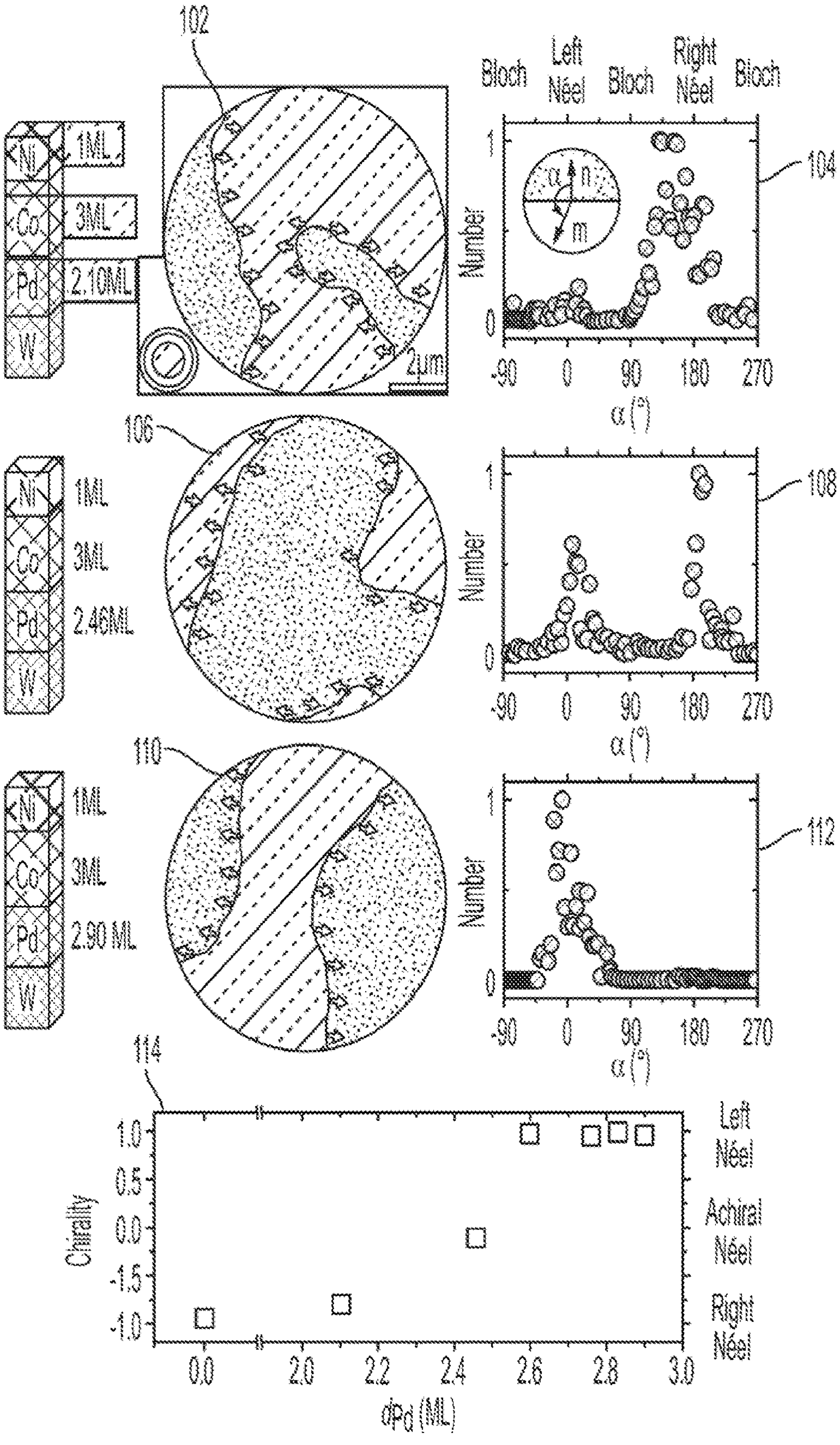
FIG. 1 illustrates an example of the Pd thickness dependent switching of the DW chirality in Ni/Co/Pd/W(110) multilayers according to embodiments of the present techniques.

Embodiments may provide the realization of large DMI and perpendicular magnetic anisotropy (PMA) induced by chemisorbed species on ferromagnets. A case in point is the large DMI induced by chemisorbed oxygen on Ni/Co/Pd/W(110) multilayers, which we measured using spin-polarized low energy electron microscopy (SPLEEM). We monitor the oxygen coverage $d_O$ dependent evolution of DW chirality in perpendicularly magnetized Ni/Co films on Pd/W(110), where the effective DMI can be tuned by precisely controlling the Pd spacer layer thickness $d_{Pd}$. We find that the chemisorbed oxygen can switch the DW chirality when the effective DMI of the bare (oxygen-free) Ni/Co/Pd/W(110) multilayer is Pd-like (left-handed) as a result of a relatively thick Pd spacer layer, but chemisorbed oxygen cannot switch the DW chirality when the Pd spacer layer is thinner and the effective DMI of the bare multilayer is tungsten-like (right-handed). A systematic measurement of the chirality in $d_{Pd}$-$d_O$ space allows us to quantify the DMI induced by chemisorbed oxygen. We find that the magnitude of the chemisorbed oxygen induced DMI is comparable to those induced at ferromagnet/heavy metal interfaces—despite the low atomic number of oxygen. We demonstrate that this oxygen induced DMI is sufficiently strong to tailor the topology of a magnetic bubble domain from a topologically trivial bubble to a skyrmion with topological charge 1.

Most notably, the observed large magnitude of the DMI induced by oxygen may be useful for the development of applications in the field of spintronics. Our results also highlight a strength of this experimental approach. Using the tunability of the DMI at the buried Pd/W interface allows precise quantification of the previously unknown DMI that is induced when another element—in this case oxygen—is chemisorbed on top of the multilayer. This approach may be a versatile method to measure unknown values of DMI induced at interfaces with other elements. For instance, chemisorption of many gases, such as $H_2$, $N_2$, $F_2$, $NH_3$, $H_2O$, $CH_3$, $CH_4$, CO, $CO_2$, or organic molecules such as bathocuproine or Tris(8-hydroxyquinoline)aluminum(III), occur on Ni(111) surface. In this work we also introduce the observation of induced DMI by chemisorbed hydrogen and bathocuproine.

A Tuneable Platform for Measuring Unknown DMI Contributions

One of the approaches to quantify the DMI in a layered system is to measure the DW spin texture as a function of layer thickness, where the sign and magnitude of the DMI can be determined by measuring the critical thickness where DW texture transitions from chiral Néel- to achiral Bloch textures. This can be done, e.g., by using SPLEEM or scanning electron microscopy with polarization analysis. If the addition of a new interface with unknown DMI to a layered system with well-understood DMI is found to switch the handedness of DWs, then the unknown DMI of the new interface can be measured in this way; for example the observation of right-handed chirality in Co/Ru(0001) and left-handed chirality in graphene/Co/Ru(0001) allowed unambiguous determination of left-handed DMI at the graphene/Co interface. The aim to generalize this experimental method motivates the development of DMI-tuneable platforms that combine pairs of buried interfaces with opposite DMI to provide magnetic surfaces with either left- or right-handed DW chirality, so that the sign of an unknown DMI at any new interfaces added to the structure can be unambiguously revealed.

In embodiments, tungsten and palladium may be chosen because they provide opposite DMI and because growth of Pd on W(110) results in high quality epitaxial films. The strong LEEM image intensity oscillations associated with the layer-by-layer growth allow the precise determination of the Pd film thickness, which permits the fine tuning of the effective DMI of the Pd/W system. Ni/Co bilayers grown on top provide perpendicular magnetic anisotropy, which allows the observation of DW chirality.

FIG. 1 shows the Pd thickness dependent switching of the DW chirality in Ni/Co/Pd/W(110) multilayers, providing the capability for tuning DMI in a Pd/W(110) system. In FIG. 1, examples of compound SPLEEM images 102, 106, 110 of Ni/Co/Pd/W(110) are shown with a scale bar of 2 μm. The arrows indicate the in-plane magnetization direction in the domain wall. For a more quantitative analysis, we measure domain wall chirality in a statistically significant number of image pixels along the domain wall center-line. Defining the parameter α as the angle between the domain wall normal direction n and the magnetization vector m at each point along the domain wall center-line (see inset in 104), histograms of this angle α measured from SPLEEM images represent the statistics of domain wall chirality. Histograms 104, 108, 112 of the angle α between DW magnetization m and DW normal vector n, measured pixel-by-pixel along DW centreline, show the evolution of chirality from right-handed Néel-type chirality (104, single peak near 180°), achiral Néel-type chirality (108, two peaks near 0° and 180°) to left-handed Néel-type chirality (112, single peak near 0°). Further, $d_{Pd}$ dependent Néel-type chirality 114 is shown.

In the compound SPLEEM images 102, 106, 110, grey/black regions represent the down/up magnetization of the perpendicular magnetized domains, respectively, and colored boundaries show DW magnetization orientation according to the color wheel shown in the inset in panel 104. The histograms 104, 108, 112 of the angle α between DW magnetization m and DW normal direction n, as defined in the inset in 102, show the statistics of DW chirality. The single prominent peak in the histogram of α in the case of Pd thickness $d_{Pd}$=2.10 monolayer (ML), see 104, indicates left-handed DW chirality; the presence of two prominent peaks in the DW magnetization histogram at $d_{Pd}$=2.46 ML shown in 108 indicates achiral DW texture with left- and right-handed DW sections; and the single peak in the histogram shown in 112 indicates left-handedness of DW spin texture at $d_{Pd}$=2.90 ML, as the Pd-like DMI dominates the system at larger Pd thickness.

Examining Chemisorbed Oxygen Induced DW Chirality

Ni(111) is a well suited surface to study the role of oxygen on the DMI as the phase diagram of oxygen chemisorbed on Ni(111) is well understood from literature, showing that two-dimensional O/Ni(111) adsorbate layers can be realized in the range of 0-0.5 ML oxygen with respect to the planar atomic density of Ni(111). As a function of coverage, two long-range ordered structures can form: a p(2×2) phase at saturation coverage of ¼ ML, and a ($\sqrt{3}\times\sqrt{3}$)R30° phase at saturation coverage of ⅓ ML. In this work we focus on room temperature oxygen adsorption in the coverage regime up to 0.29 ML, where no formation of NiO is observed (see Methods).

The presence of adsorbed oxygen on Ni/Co/Pd/W(110) samples favors right-handed chirality. This is unambiguously demonstrated by utilizing the tuneability of the DMI in this multilayer, where the chirality of the magnetic layer can be adjusted from left-handed to achiral to right-handed, as a function of the thickness of the Pd spacer.

Figure 2:
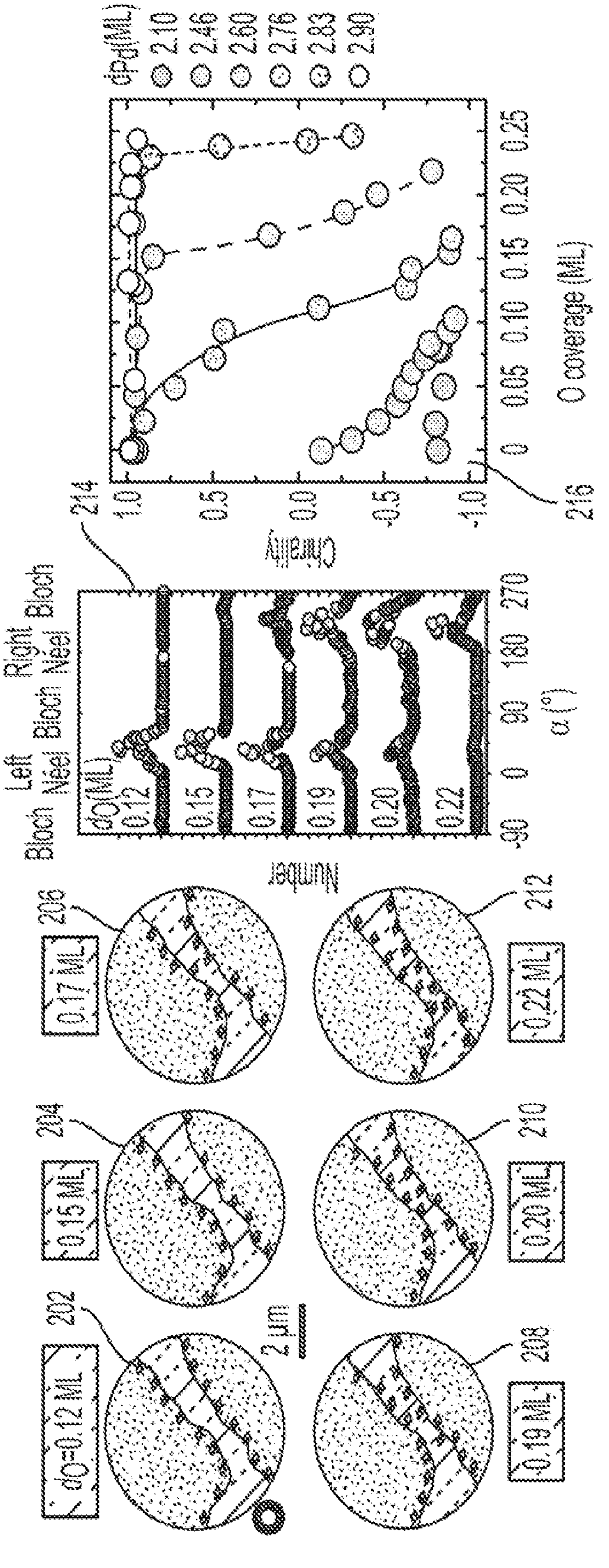
FIG. 2 illustrates an example of chemisorbed oxygen dependent chirality evolution according to embodiments of the present techniques.

FIG. 2 illustrates an example of chemisorbed oxygen dependent chirality evolution. In this example, compound SPLEEM images 202-212 show O/Ni(1 ML)/Co(3 ML)/Pd (2.76 ML)/W(110), with oxygen coverages labelled for each image. The scale bar is 2 μm. White arrows indicate the in-plane magnetization direction in the domain wall. FIG. 2 includes an oxygen coverage dependent histogram 214 of angle α between DW magnetization m and DW normal vector n, measured from panels 202-212, showing the evolution of chirality from left-handed Néel type to right-handed Néel type. FIG. 2 further shows an illustration 216 of the oxygen coverage dependent evolution of Néel-type chirality for different Pd thicknesses.

In the O-coverage dependent magnetization images 202-212, at $d_{Pd}$=2.76 ML, the α histogram derived from each image shows that the chirality evolves from left-handed at $d_O$=0.12 ML to achiral near $d_O$=0.19 ML, and to right-handed chirality at $d_O$=0.22 ML. This trend can also be seen in samples with other Pd thickness, as shown in illustration 216: for Pd layer thickness $d_{Pd}$=2.46 ML the achiral state with essentially vanishing DMI occurs with the pristine Ni(111) surface and, as oxygen coverage is introduced, chirality gradually evolves to right-handedness at $d_O$=0.22 ML. The left-to-righthanded chirality switch occurs at progressively larger O coverage as $d_{Pd}$ is increased, as shown in 216 for $d_{Pd}$=2.60 ML, $d_{Pd}$=2.76 ML, $d_{Pd}$=2.83 ML. This is because the effective left-handed DMI increases with the Pd layer thickness and more O coverage is required to provide the balancing right-handed DMI.

Quantifying Chemisorbed Oxygen Induced DMI

Figure 3:
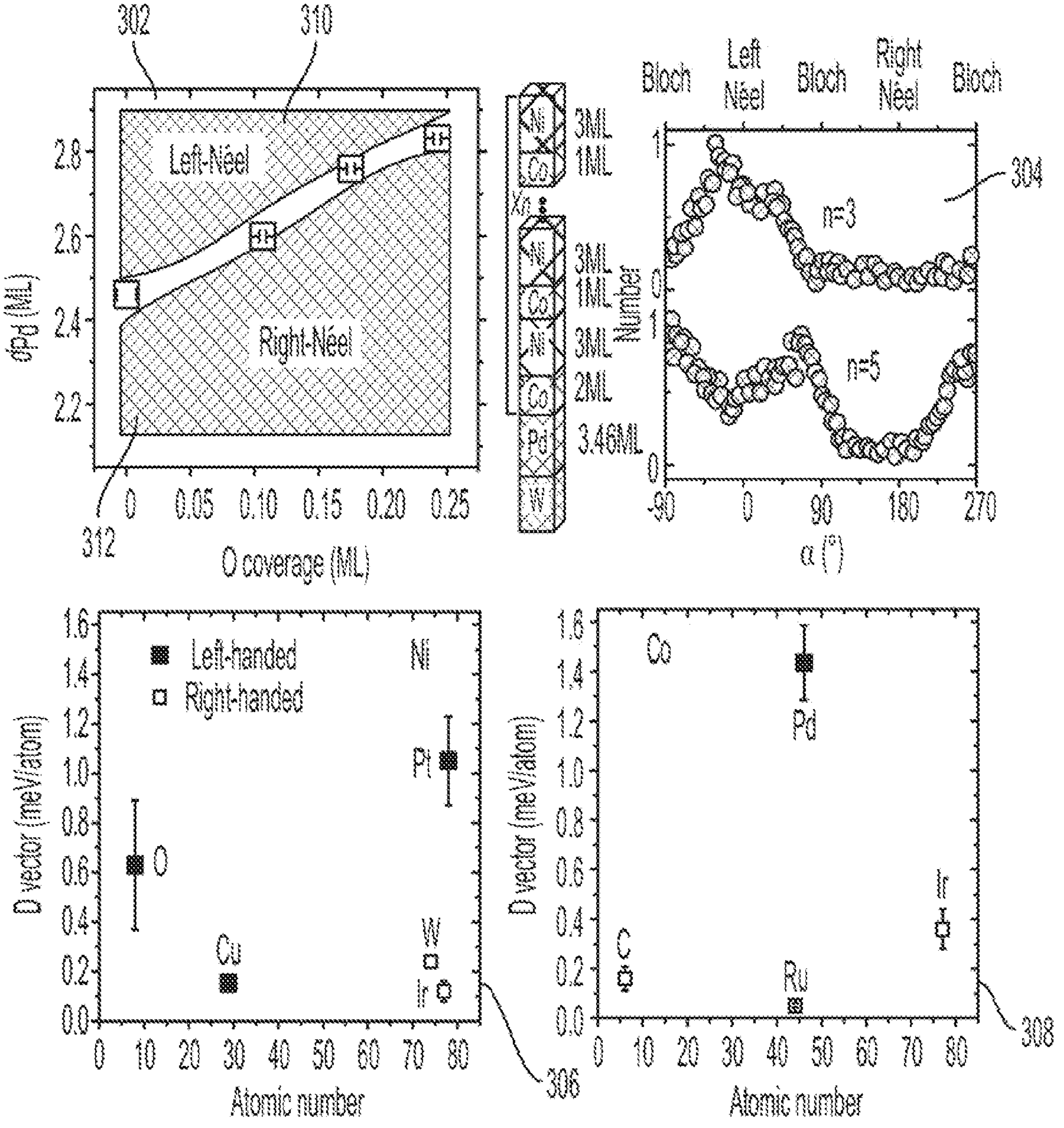
FIG. 3 illustrates an example of quantification of oxygen chemisorption-induced DMI according to embodiments of the present techniques.

Summarizing oxygen coverage dependent chirality at each Pd thickness in FIG. 2 at 216, the phase diagram of magnetic chirality in $d_O$-$d_{Pd}$ space is shown in FIG. 3, at 302, where the achiral state is shown as the boundary between left-handed Néel DW texture 310 and right-handed Néel texture 312. Obtaining the slope of the boundary provides an opportunity to compare the Pd-induced DMI at the Co/Pd interface and that of the chemisorbed oxygen-induced DMI at the oxygen/Ni interface. Noting that the achiral state indicates zero effective DMI, we can for instance compare two achiral states at $d_{Pd}$=2.46 ML, $d_O$=0 ML and at $d_{Pd}$=2.83 ML, $d_O$=0.24 ML (see squares in the phase diagram): this indicates that the magnitude of the DMI change induced by a change in Pd layer thickness of $\Delta d_{Pd}$=0.37 ML is effectively equal to the DMI change induced by a change in oxygen coverage of $\Delta d_O$=0.24 ML at the oxygen/Ni interface, suggesting that the strength of the DMI at the oxygen/Ni interface is substantial.

FIG. 3 illustrates an example of quantification of oxygen chemisorption-induced DMI. A phase diagram 302 of chirality in $d_{Pd}$-$d_O$ space is shown. Dependence of wall texture transition points permit determination of the oxygen-induced DMI by comparing with Pd thickness-induced DMI variation. A histogram 304 is shown of angle α in [3Ni/1Co]$_2$/3Ni/2Co/3.46Pd/W(110) multilayer (upper plot) with a single peaks near 0°, and histogram of angle α in [3Ni/1Co]$_4$/3Ni/2Co/3.46Pd/W(110) multilayer (lower plot) with double peaks at ~−90° and ~+90°. Modelling the film thickness dependence of this chirality transition allows the determination of the DMI strength of the system [as described by Yang, Chen, et al. Nature Materials. 17, 605-609 (2018)]. The summarized magnitude of the DM vector at Ni/[non-magnetic material] interfaces 306 and Co/[non-magnetic material] interfaces 308 are shown, all extracted by the same approach used herein.

In the following we discuss how to quantitatively extract the strengths of these DMI contributions. We start by measuring the DMI in [Ni/Co]$_n$/Pd/W(110) with $d_{Pd}$=3.46 ML, which is 1 ML thicker than the zero-DMI case of $d_{Pd}$ (2.46 ML). This measurement is based on observing DW configurations as a function of the thickness of the magnetic layer. The approach is to measure the DMI by tracking the competition between the interfacial DMI, which favours chiral Néel walls, and the dipolar interaction, which favours Bloch walls. Thus, one can indirectly estimate the DMI strength by calculating the dipolar energy penalty of Néel walls at the experimentally measured thickness of the magnetic film at which the Néel/Bloch DW texture transition occurs. In [Ni/Co]$_n$/3.46 ML Pd/W(110) multilayers we find that this transition occurs between the thicknesses of n=3 and n=5 [Ni/Co] repeats, where the DWs are chiral Néel-type in the thinner Ni/Co multilayer and achiral Bloch-type in the thicker Ni/Co multilayer (304). Micromagnetic computation of the dipolar energy difference between Néel and Bloch DWs at this critical thickness yields an estimate of the effective DMI of 0.41±0.17 meV/atom in [Ni/Co]$_n$/3.46 ML Pd/W(110) (as described by Yang, Chen, et al.). Taking into account that the effective DMI contribution from the upper [Ni/Co] repeats of the multilayers vanishes due to inversion symmetry, this estimated DMI value is attributed to the interface between the Co layer and the 3.46 ML Pd/W(110) film. Using the same approach, we further measured the DMI at the Co interface with bulk Pd in the [Ni/Co]$_n$/Pd (111) system, finding $D_{Co/Pd}$=1.44±0.15 meV/atom. These results show that the bulk Pd induced DMI is much larger than the DMI variation induced by a small Pd thickness change in the Co/Pd/W(110) system, similar to the smooth thickness dependence observed in another heavy-metal induced DMI system. Consequently, for sub-monolayer variations of the Pd layer thickness we can approximate that the DMI varies linearly with Pd thickness. Under this approximation, the DMI change induced by a Pd layer thickness variation of $\Delta d_{Pd}$=0.37 ML is about 37% of the DMI change induced by a Pd layer thickness variation of $\Delta d_{Pd}$=1 ML which, as described above, amounts to 0.41±0.17 meV/atom. As our experiments show that the DMI variation induced by $\Delta d_{Pd}$=0.37 ML equals that induced by adding 0.24 ML oxygen onto the Ni surface, these measurements allow an estimate of the DMI at Ni/oxygen as $$(0.41 \pm 0.17)\times\frac{0.37}{0.24} = 0.63 \pm 0.26 \text{ meV/atom}$$

for 1 ML of oxygen coverage.

It is interesting to compare this value of the oxygen-induced DMI on this Ni surface to a number to other DMI values as summarized at 306 and 308. Here we compare only measurements derived using the same experimental approach, as described in Chen et al. and Jiang et al., in order to avoid possible variations associated with potential systematic biases due to the use of different methods. Comparing to another light element, the DMI at the oxygen/Ni interface is approximately four times larger than that at the graphene/Co interface, where $D_{graphene/Co}$=0.16±0.05 meV/atom. The chemisorbed oxygen induced DMI is comparable to the DMI induced at interfaces with many transition metals. For interfaces with Ni (306) $D_{Ni/Pt}$=1.05±0.18 meV/atom, $D_{Ni/Ir}$=0.12±0.04 meV/atom , $D_{Ni/W}$≈0.24 meV/atom, and $D_{Ni/Cu+Fe/Ni}$=0.15±0.02 meV/atom. For interfaces with Co (308): $D_{Co/Ir}$=0.36±0.08 meV/atom, $D_{Co/Ru}$=0.05±0.01 meV/atom, and $D_{Co/Pd}$=1.44±0.15 meV/atom as measured in this work.

Tailoring Chirality of Spin Textures Via Oxygen

The large DMI induced by oxygen opens up new possibilities for designing chiral spin textures without using heavy metals. In the following we demonstrate experimentally that chemisorbed oxygen can be used to tailor the spin texture of a magnetic bubble.

Figure 4:
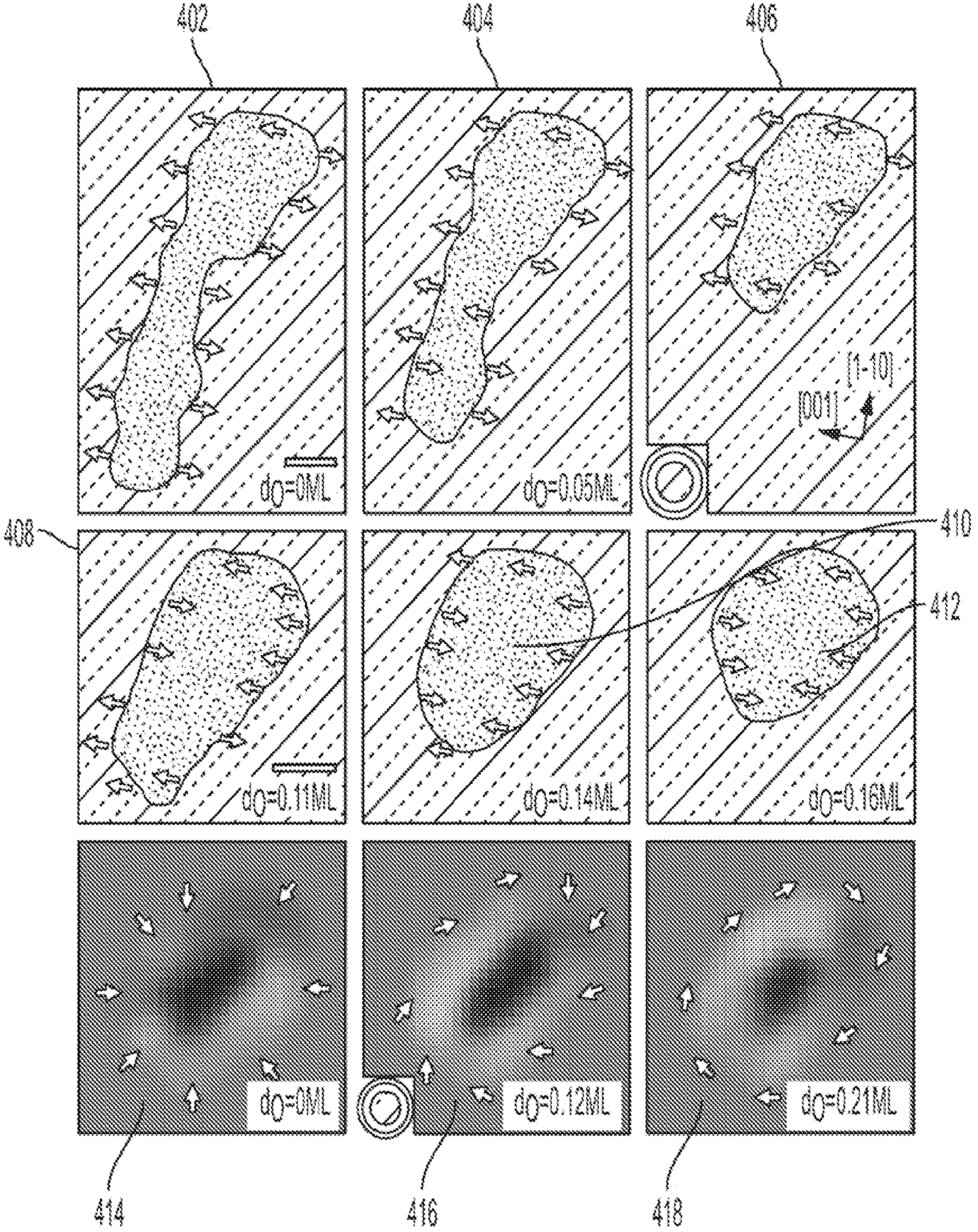
FIG. 4 illustrates examples of manipulation of chirality of a magnetic bubble domain and domain wall type of a magnetic skyrmion by oxygen chemisorption according to embodiments of the present techniques.

FIG. 4 illustrates examples of manipulation of chirality of a magnetic bubble and domain wall of a magnetic skyrmion by oxygen. Compound SPLEEM images in FIG. 4 (402-412) highlight DW structures in a down-magnetized magnetic bubble with uniaxial anisotropy at various oxygen coverages in a Ni(1 ML)/Co(3 ML)/Pd(2.6 ML)/W(110) sample, where a complete chirality transition from left-handed (402) to achiral (408) to right-handed (412) is observed. Note that the deformation of the bubble shape is due to the oxygen-induced change of perpendicular magnetic anisotropy. To demonstrate the role of oxygen-induced DMI on regular skyrmions, we also performed experiments on oxygen-assisted skyrmion evolution in the isotropic $[Co/Ni]_3$/Cu(111) system, without any uniaxial anisotropy. The skyrmion shown at 414 is a left-handed hedgehog type. With increasing oxygen coverage (0.12- and 0.21-ML oxygen at 416 and 418, respectively), the skyrmion gradually evolves to the Bloch-type. Note that the Bloch-type chirality is not defined by the interfacial DMI. These results represent a new approach to tailor the inner structure of magnetic bubbles or skyrmions, which may influence the stability and dynamic properties of the initial bubble domain, due to possible changes of topological number or DW-type dependent current-induced dynamics.

Note that the DMI of oxygen adsorbed on top of Ni favors right-handed DW textures, which is the same handedness as Pt/Ni and Pd/Ni, suggesting that earth-abundant oxygen could potentially be used as an alternative to replace those rare noble metals in device applications. The large magnitude of the DMI at the oxygen/Ni interface may be sufficient to stabilize magnetic chirality in a few nm thick magnetic films, for instance, the chirality in typical perpendicular magnetic anisotropy multilayers $[Co_{1mL}/Ni_{2ML}]_n$ might be stabilized up to n=5 (roughly 3 nm thick). While the physical origin of the large magnitude of the oxygen induced DMI is an open question, it is plausible that it may be linked to the charge transfer at the oxygen/metal interface, which suggests that some other light elements may also induce significant DMI.

Figure 5:
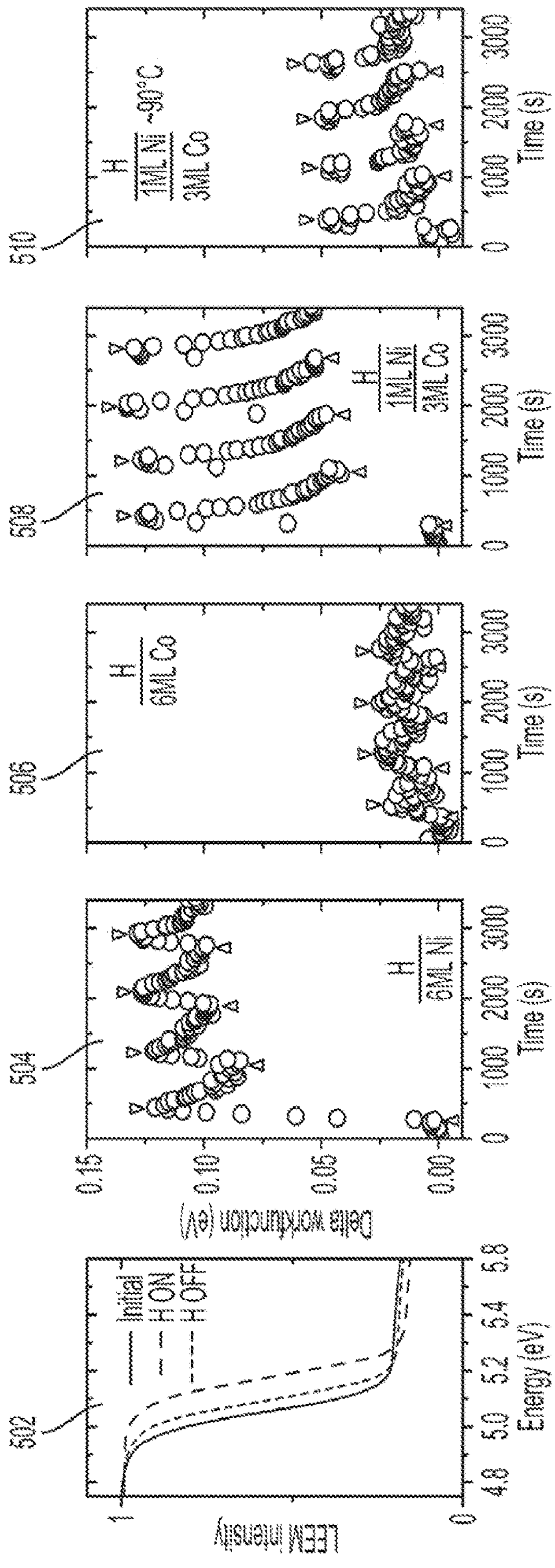
FIG. 5 illustrates an example of detection of reversible chemisorption/desorption of hydrogen on magnetic surfaces according to embodiments of the present techniques.

Reversible Chemisorption/Desorption of Hydrogen on Ni(111) and Co(0001) Surfaces Measuring the work function on solid surfaces has been widely used to quantitatively understand hydrogen chemisorption. The work function shift Δφ upon hydrogen chemisorption on Ni(111) and Co(0001) allows the determination of the hydrogen coverage. FIG. 5 illustrates an example of room temperature observation of reversible chemisorption/desorption of atomic hydrogen on metal surfaces. An example of LEEM IV spectra on bare 1 ML Ni/3 ML Co (initial) and the same surface before/after the hydrogen exposure is shown in 502. Measuring the energy at which the reflectivity drops allows quantification of the work function. Examples of work function response on the surface of metals during the presence/absence of hydrogen at room temperature are shown at 504, 506, 508. Red(▲)/black(▼) triangles indicate the on/off control of the hydrogen leak valve. At 504, an example with 6 ML Ni is shown. At 506, an example with 6 ML Co is shown. At 508, an example with 1 ML Ni/3 ML Co is shown. An example of a work function response of 1 ML Ni/3 ML Co at ~90° C. is shown at 510, indicating ~90% chemisorption/desorption ratio.

The LEEM is a powerful tool to measure the work function of material surfaces by fitting LEEM IV curves (502). We observed a work function increase of Δφ≈120 meV on a (111) oriented Ni film upon 0.9 Langmuir (L) hydrogen exposure (180 seconds at $5\times10^{-9}$ torr) at room temperature (502). This significant work function shift is in excellent agreement with prior work, where a shift of Δφ≈135 meV was reported to occur upon hydrogen adsorption on a Ni(111) surface at 41° C. with hydrogen pressure set to $5\times10^{-9}$ torr.

To explore the possible reversibility at room temperature, the evolution of Δφ is monitored during cycles of ON/OFF states of hydrogen at $5\times10^{-9}$ torr/base pressure (see Methods). For the hydrogen covered Ni(111) surface, prior work identified two desorption maxima around 310 K ($\beta_1$ state) and 380 K ($\beta_2$ state) using the flash desorption approach, and only the ($\beta_2$ state was found to get filled at small hydrogen coverage. Note that the atomic hydrogen occupies three-fold hollow sites with Ni—H bond length 1.84±0.06 Å on Ni(111), corresponding to an overlayer-substrate spacing of 1.15±0.1 A. Because the desorption temperature of the $\beta_1$ state is just above room temperature, spontaneous hydrogen desorption at room temperature is expected during evacuation of the vacuum chamber. An example of the work function shift Δφ on a Ni(111) surface as a function of time over four ON(3min)/OFF(10min) cycles is shown in 504. The plot shows the gradual work function increase of Δφ≈120 meV during the first hydrogen exposure (0.9 L), and reversible oscillations of Δφ during the subsequent ON/OFF cycles with an amplitude of about ±40 meV. The known dependence of Δφ on the hydrogen coverage , indicates that chemisorption of hydrogen on Ni(111) is indeed partly reversible at room temperature, and desorption is likely limited to the $\beta_1$ state. Consistent with prior literature, our result indicates that roughly one third of hydrogen can be reversibly chemisorbed/desorbed on a Ni(111) film surface at room temperature and under ultrahigh vacuum (UHV) conditions. Note that this coverage ratio may vary with a different hydrogen dose and pressure.

Hydrogen chemisorption also occurs on the Co(0001) surface, where temperature programmed thermal desorption measurements indicated desorption maxima with coverage dependent positions around 325-370 K ($\beta_1$ state) and 400-420 K ($\beta_2$ state), somewhat resembling the case of Ni(111). Similar to Ni(111), we found that cyclical hydrogen chemisorption/desorption on a Co(111) film is associated with a reversible work function change, albeit the amplitude is smaller with $\Delta\varphi\approx\pm 20$ meV. In 506, an example of a plot of time-dependent $\Delta\varphi$ measurements over four ON (3 min at $5\times10^{-9}$ torr)/OFF(10 min) cycles is shown. The observed spontaneous hydrogen desorption from Co(0001) films at room temperature is consistent with the detailed thermal desorption study of this system reported in Huesges and Christmann [Z. Phys. Chem. 227, 881 (2013)].

For DMI measurements described in detail below, we will use Ni/Co/Pd/W(110) multilayer samples. Here we first discuss the hydrogen chemisorption properties of such structures. Interestingly, we find that the hydrogen coverage ratio that results in cyclical chemisorption/desorption at room temperature can be greatly enhanced on these multilayer structures, compared to the single-element films described above. An example of the evolution of $\Delta\varphi$ on the surface of a N(1)/Co(3)/Pd(2)/W(110) multilayer is shown in 508, where the numbers 1 ML and 3 ML stand for layer thickness in atomic monolayer (ML) of the Ni and Co layers, respectively. In 508 identical hydrogen ON/OFF cycles as shown in panels 504 and 506 were used. We find that the initial work function rise of $\Delta\varphi\approx 125$ meV upon hydrogen exposure (3 min at $5\times10^{-9}$ torr) is comparable to $\Delta\varphi$ observed on Ni(111) (~120 meV). However, the amplitude of work function oscillations during the subsequent hydrogen pressure cycles is around 80 meV, about two thirds of the initial $\Delta\varphi$. This amplitude is almost twice that observed in the thicker (6 ML) Ni(111) film (504). The element Pd is known for its large bulk hydrogen adsorption capacity and one might surmise that the presence of 2 ML Pd underneath the Ni/Co bilayer has something to do with the observed enhancement of hydrogen induced work function change. However, using a Ni(1)/Co(3)/Pd(20)/W(110) sample with a ten-fold thicker Pd layer, we observe that the $\Delta\varphi$ evolution induced by identical hydrogen ON/OFF cycles is almost identical as in the sample with just 2 ML Pd. This suggests that the large $\Delta\varphi$ ON/OFF ratio originates from the top Ni/Co bilayer, and not from the Pd layer. An even greater $\Delta\varphi$ ON/OFF ratio can be achieved on the same Ni(1)/Co(3)/Pd (2)/W(110) structure at elevated temperatures. In 510 it is shown that when the sample is held at 90° C. then in the hydrogen OFF part of the cycles the work function nearly fully recovers to the initial value of the hydrogen-free surface. As a result, the ratio of hydrogen coverage extrema in the ON/OFF cycles is on the order of ~90% of the initial work function rise. This observation is consistent with the reported observation of the two desorption maxima at 310 K ($\beta_1$ state) and 380 K ($\beta_2$ state) in the hydrogen/Ni(111) system. Note that our observed initial work function rise of $\Delta\varphi\approx 50$ meV at 90° C. is also in reasonable agreement with the value of $\Delta\varphi\approx 40$ meV reported in Christmann et al. [J. Chem. Phys. 60, 4528 (1974)] for Ni(111) at 89° C. in $5\times10^{-9}$ torr hydrogen.

Exploring Interfacial DMI Induced by Chemisorbed Hydrogen

Direct measurement of magnetic chirality is one of the major approaches to unravelling the interfacial DMI. For instance, ground-breaking observations of cycloidal spin spirals using spin-polarized scanning tunneling microscopy have revealed the role of the interfacial DMI on magnetic chirality as well as the period of the spin spirals. More recently, observation of magnetic chirality in magnetic domain walls also allows the quantification of the magnitude and sign of the interfacial DMI. A particularly versatile approach to measure the DMI at the top interfaces of magnetic multilayers emerges when the magnitude and sign of the effective DMI induced at buried interfaces within the structure can be tuned predictably and accurately. This can be done by using hybrid substrates composed of a bulk crystal coated with a spacer layer where the crystal and spacer induce a DMI of opposite sign, such as Ir/Pt(111), or Pd/W(110). The advantage of using a tunable-DMI substrate in this fashion was previously demonstrated in quantifying the DMI induced by chemisorbed oxygen on the Ni(111) surface. Here we test the DMI induced by chemisorbed hydrogen on the top surface of Ni(1)/Co(3)/Pd($d_{Pd}$)/W(110), where the effective DMI in the buried interfaces favors left-handed Néel chirality (Pd-like) at thick Pd thickness $d_{Pd}$, and right-handed Néel chirality (W-like) at thin $d_{Pd}$.

Figure 6:
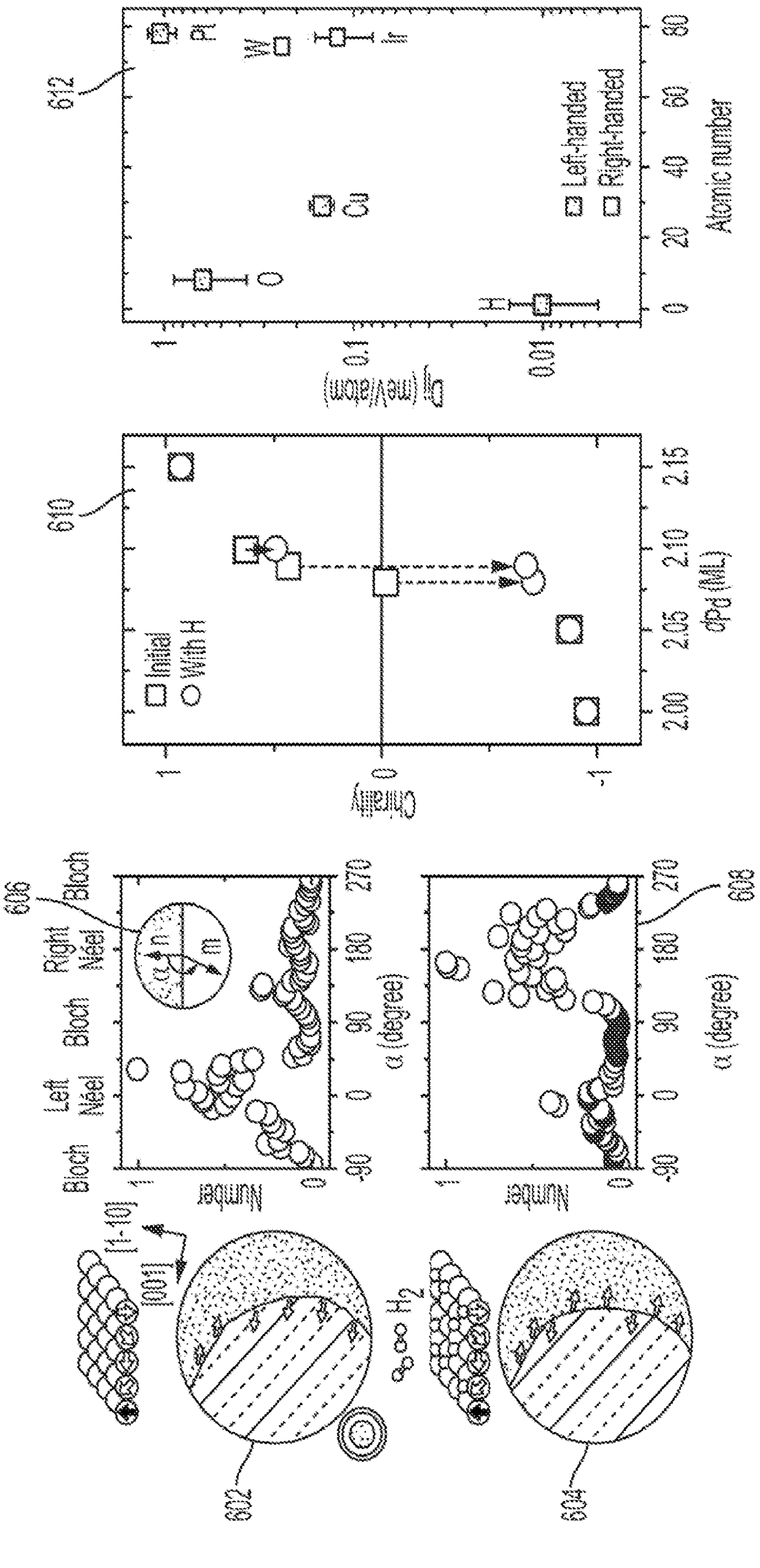
FIG. 6 illustrates an example of exploring a chemisorbed hydrogen induced Dzyaloshinskii-Moriya interaction according to embodiments of the present techniques.

FIG. 6 illustrates an example of exploring a chemisorbed hydrogen induced Dzyaloshinskii-Moriya interaction. Observation of hydrogen induced domain wall chirality switching in compound SPLEEM images of 1 ML Ni/3 ML Co/2.09 ML Pd/W(110) is shown in 602, 604. In 602, as-grown chirality is shown (602 shows left-handed walls in magnetic layers). In 604, chirality with hydrogen exposure at 5×10$^{-9}$ torr is shown (604 shows right-handed walls upon hydrogen chemisorption). The black/gray area indicates perpendicularly magnetized up/down domains, colors indicate the in-plane orientation of magnetization in the domain wall region. In 606, 608, $\alpha$ histograms of the SPLEEM images are shown—before hydrogen exposure in 606, and after the hydrogen exposure in 608, $\alpha$ is the angle between domain wall magnetization m and domain wall normal vector n (insert). In 610, hydrogen exposure dependent evolution of Néel-type chirality at various Pd thicknesses is shown. In 612, summarized values of $D_{ij}$ induced by various elements adjacent to Ni are shown, all measured by the same SPLEEM-based method.

What makes this method advantageous for quantifying even rather weak DMI contributions is the fact that the magnitude and sign of the effective DMI of the buried interfaces can be fine-tuned right around the point of null-DMI. Here we tracked the magnetic chirality evolution upon hydrogen chemisorption on various samples with different initial chirality. We observe a clear hydrogen-induced chirality switching in samples with Pd spacer layer thickness $d_{Pd}\neq 2.09$ ML, where the effective DMI of the hydrogen-free multilayer is weakly Pd-like (left-handed). In 602, a SPLEEM image of the sample in the as-grown state is shown, where the domain wall magnetization preferentially points from grey domain (−Mz) to the black domain (+Mz), corresponding to left-handed Néel chirality. Upon hydrogen chemisorption, it is shown that the same domain wall evolves to right-handed Néel chirality (now the domain wall magnetization predominantly points from black domain (+Mz) to grey domain (−Mz) at 604). We denote this switching of the magnetic chirality as the chirality transition. In 606, 608, it is shown that, before/after an 0.9 Langmuir hydrogen exposure, the peak at $\alpha$~0°, in 606, indicates left-handed Néel chirality, whereas the peak at α~180°, in 608, indicates right-handed Néel structure. This statistical approach allows quantification of the chirality transition as shown in 610, where the average domain wall chirality before and after 0.9 Langmuir hydrogen exposure is plotted for several samples, as a function of Pd spacer layer thickness $d_{Pd}$. Note the hydrogen coverage resulting from this dose at room temperature can be roughly estimated as $d_H$=(0.6±0.1) ML with respect to the planar atomic density of Ni(111) (Methods). When the Pd spacer layer is too thin and the effective DMI remains W-like (right-handed), as in the $d_{Pd}$=2.00 ML and $d_{Pd}$=2.05 ML measurements, then the domain wall chirality remains completely unaffected by hydrogen chemisorption. Likewise, when the Pd spacer layer is too thick, as in the $d_{Pd}$=2.15 ML sample, then the Pd-like effective DMI (left-handed) is sufficiently strong to dominate the domain wall spin texture, and the spin texture of the wall remains unaffected even after hydrogen chemisorption. However, when the initial DMI is sufficiently weak, as in the samples with $d_{Pd}$=2.08 ML, 2.09 ML and 2.10 ML, then hydrogen chemisorption induces a transition of the domain wall chirality, clearly revealing the right-handed DMI induced at the hydrogen/Ni(111) top interface. Note that the typical Néel- to Bloch-wall transition near zero DMI is suppressed because a weak in-plane uniaxial magnetic anisotropy in this system prevents Bloch-like alignment of domain wall magnetization along the W[1-10] direction. The Néel components of the wall magnetization, however, are clearly sensitive to the sign of the DMI. These results show that chemisorbed hydrogen on top of the Ni(111) surface introduces finite DMI favoring right-handed spin structures, i.e. the sign of the DMI induced by an overlayer is the same as for Pt, Pd or oxygen.

Estimation of the Strength of Chemisorbed Hydrogen Induced DMI

The systematic $d_{Pd}$ spacer layer thickness-dependent chirality studies summarized in 610 allows estimation of the magnitude of the hydrogen induced DMI. The chirality evolution towards right-handedness is observed between 2.08 ML and 2.10 ML during 0.6 ML hydrogen chemisorption. Above 2.10 ML Pd, no significant chirality change can be observed as the initial effective Pd-like DMI now dominates and hydrogen induced DMI at the Ni(111) surface can no longer affect the chirality. This approach provides an opportunity to quantify the hydrogen induced DMI by linking it to the dependence of the initial DMI on the Pd spacer layer thickness $d_{Pd}$. Without hydrogen the achiral state of domain walls, where the effective DMI is essentially zero, occurs at $d_{Pd}$≈2.08 ML. Upon chemisorption of 0.6 ML hydrogen the achiral state shifts to $d_{Pd}$=(2.095±0.004) ML. The relative change of the DMI in the Ni/Co/Pd/W (110) system as a function of the Pd layer thickness $d_{Pd}$ was previously quantified as (0.41±0.17) meV/atom per monolayer $\Delta d_{Pd}$=1 ML. The measurements summarized in 610 show that the change of effective DMI induced by 0.6 ML hydrogen chemisorption on top of the Ni/Co/Pd/W(110) multilayer is equivalent to the change of the DMI induced by increasing the Pd spacer layer thickness by $d_{Pd}$=(2.095−2.08) ML=(0.015±0.004) ML in the absence of hydrogen. Therefore, the DMI induced by the chemisorbed hydrogen on Ni/Co/Pd/W can be estimated as $$(0.41 \pm 0.17) \times \frac{0.015 \pm 0.004}{0.6 \pm 0.1} \text{ meV/atom} = (0.01 \pm 0.005)$$

meV/atom for 1 ML equivalent hydrogen coverage.

In 612 is shown a comparison of the DMI induced by various elements adjacent to Ni. For instance, the chemisorbed hydrogen induced DMI is much weaker than the chemisorbed oxygen induced DMI on Ni, which is (0.63±0.26) meV/atom at 1 ML equivalent oxygen coverage. The strength of the hydrogen induced DMI is one to two orders of magnitude smaller than the DMI induced at Ni/transition metal interfaces, for example, $D_{Ni/Cu+Fe/Ni}$=(0.15±0.02) meV/atom, $D_{Ni/W}$≈0.24 meV/atom, $D_{Ni/Ir}$=(0.12±0.04) meV/atom, $D_{Ni/Pt}$=(1.05±0.18) meV/atom. The hydrogen induced DMI is also much weaker than the DMI induced at the Co/graphene interface, which is (0.16±0.05) meV/ atom. Note that here we only compare DMI measured in SPLEEM-based experiments using methods, to avoid possible systematic measurement biases resulting from the use of different methods.

Hydrogen-Assisted Reversible Control of the Chirality

The observation of substantial reversibility of hydrogen chemisorption by desorption in clean UHV at room temperature, together with the observed hydrogen induced switching of domain wall chirality, suggests the possibility to reversibly switch the domain wall chirality by hydrogen chemisorption/desorption cycles. To test this possibility, we use SPLEEM to continuously monitor the domain wall magnetization in a Ni(1 ML)/Co(3 ML)/Pd(2.09 ML)/W (110) multilayer, while periodically cycling between $5\times10^{-9}$ torr hydrogen pressure for 3 minutes and negligible hydrogen pressure (UHV base pressure) for 10 minutes (Methods).

Figure 7:
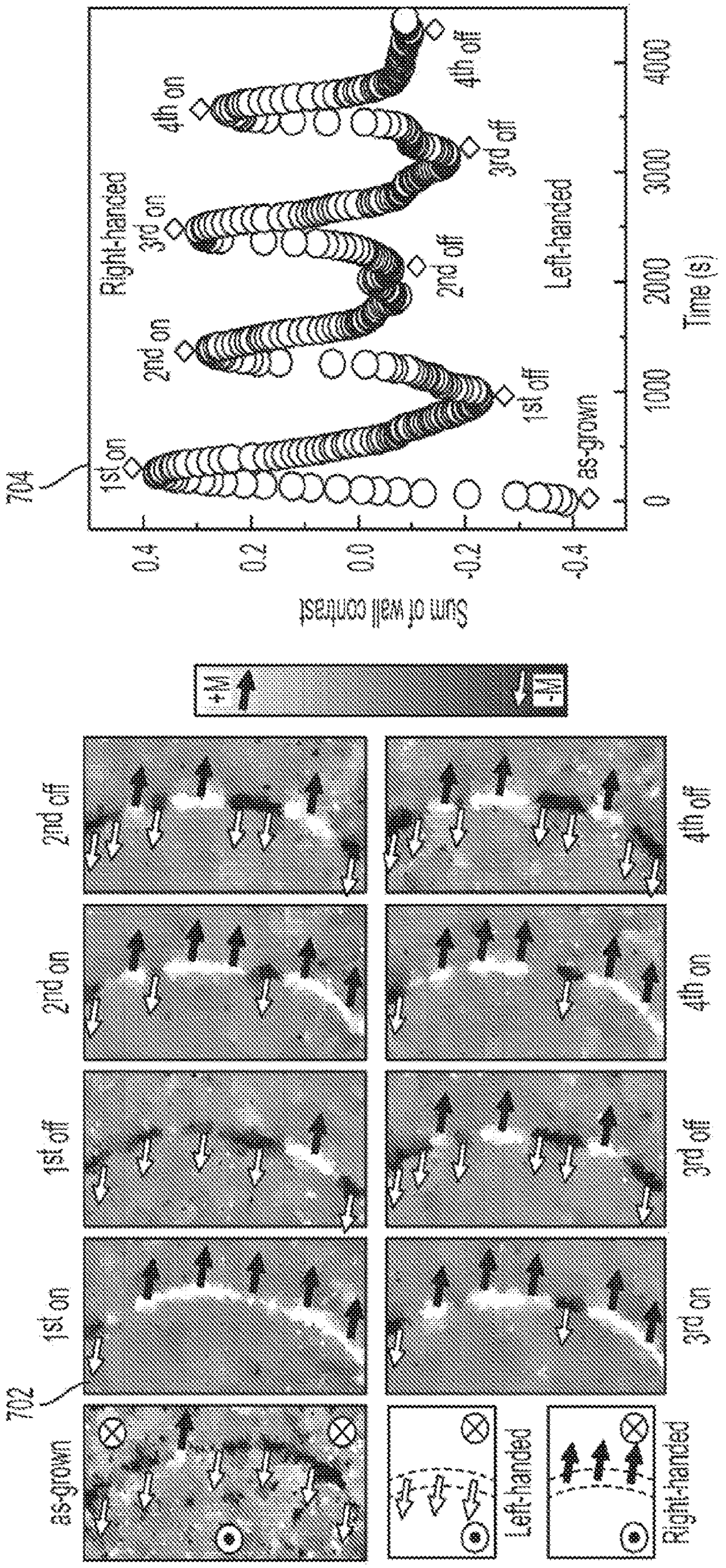
FIG. 7 illustrates an example of reversible control of DW chirality by chemisorption/desorption of hydrogen on Ni/Co/Pd/W surface according to embodiments of the present techniques.

FIG. 7 illustrates an example of reversible switching of magnetic chirality via hydrogen at room temperature. In 702, a time sequence of SPLEEM images of a domain wall in a Ni(1 ML)/Co(3 ML)/Pd(2.09 ML)/W(110) system is shown, the hydrogen status is labelled above/below the images. The in-plane magnetization in the domain wall region is rendered in grey-level according to the scale bar (right). Domains left and right of the domain wall are perpendicular magnetized. The magnetization in the left/ right region points up/down, respectively. Magnetic chirality is highlighted by red(pointing to right)/cyan(pointing to left) arrows (see sketch). The field of view is 2 μm×4 μm. 704 Evolution of average magnetic chirality (derived from the sum of the wall contrast). Grey diamonds indicate the timing of the images in 702.

In 702, it is shown that the evolution of the domain wall chirality in the four cycles, where the chirality switched from predominantly left-handed to predominantly right-handed upon the 1 hydrogen chemisorption (see the definition of the chirality in 702), and the chirality partially evolves toward left-handedness/right-handedness during "H-off"/ "H-on" states for the rest of the cycles. In 702, it is shown that the statistics of this domain wall switching experiment, tracking reversibility of the chirality over four cycles at room temperature (Methods). This magnetic chirality measurement is correlated with a hydrogen coverage measurement, as monitored by tracking the work function change of +120 meV for the H-on state and ±80 meV for the subsequent cycles. These results indicate that the hydrogen coverage changes shown in 508 indeed reversibly affect the DMI of the system so as to switch the sign of the effective DMI as well as the domain wall chirality. In this experiment, the chirality reversal during the H-off state is imperfect in the sense that a small fraction of domain wall sections remains in the right-handed state corresponding to the hydrogen induced DMI. It is plausible that these minor imperfections in the chirality switching are due to a combination of defect-induced pinning and the weaker DMI associated with residual hydrogen coverage due to incomplete desorption in the 10-minute OFF cycles.

Origin of Hydrogen Induced DMI

The physical origin of the finite DMI induced by chemisorbed hydrogen might be related to the electric surface dipole moment induced by charge transfer at the interface , where the charge transfer can be explained by the difference in electronegativity between hydrogen and 3d ferromagnets (hydrogen has a Pauling electronegativity of 2.20 and 3d ferromagnets have a Pauling electronegativity of about 1.9). The presence of a hydrogen-induced electric dipole moment on the Ni surface is consistent with the significant work function change (about 120 meV) induced by the hydrogen adlayer (FIG. 5). Our results provide experimental support for the theoretical prediction of the relationship between the DMI and electronegativity. It is interesting to note that the sign of the chemisorbed hydrogen induced DMI and chemisorbed oxygen induced DMI is the same, both favoring right-handed spin textures when adatoms are on top of the surface, possibly because Pauling electronegativities of hydrogen (2.20) and oxygen (3.44) are both greater than that of 3d ferromagnets (about 1.9). It would be interesting to explore if the sign of the DMI may switch for materials with lower Pauling electronegativity on 3d ferromagnets. Chemisorption of hydrogen occurs on many transition metals, in particular a considerable hydrogen induced dipolar moment appears (via the observation of a work function shift) on the surfaces of ferromagnetic metals such as cobalt, nickel and iron or 4d/5d metals, and we expect that chemisorbed hydrogen induced DMI can be generally observed on ferromagnetic thin films. However, the reversibility demonstrated in FIGS. 5 and 7 may require additional testing for each specific case.

Writing/Deleting Magnetic Skyrmions via Hydrogen Chemisorption

Magnetic skyrmions are a promising type of information carrier in spintronics devices with ultra-low energy consumption, and the creation/annihilation of skyrmions is a key step toward skyrmion-based devices. Here we demonstrate that chemisorption is a new way to write/delete magnetic skyrmions.

Figure 8:
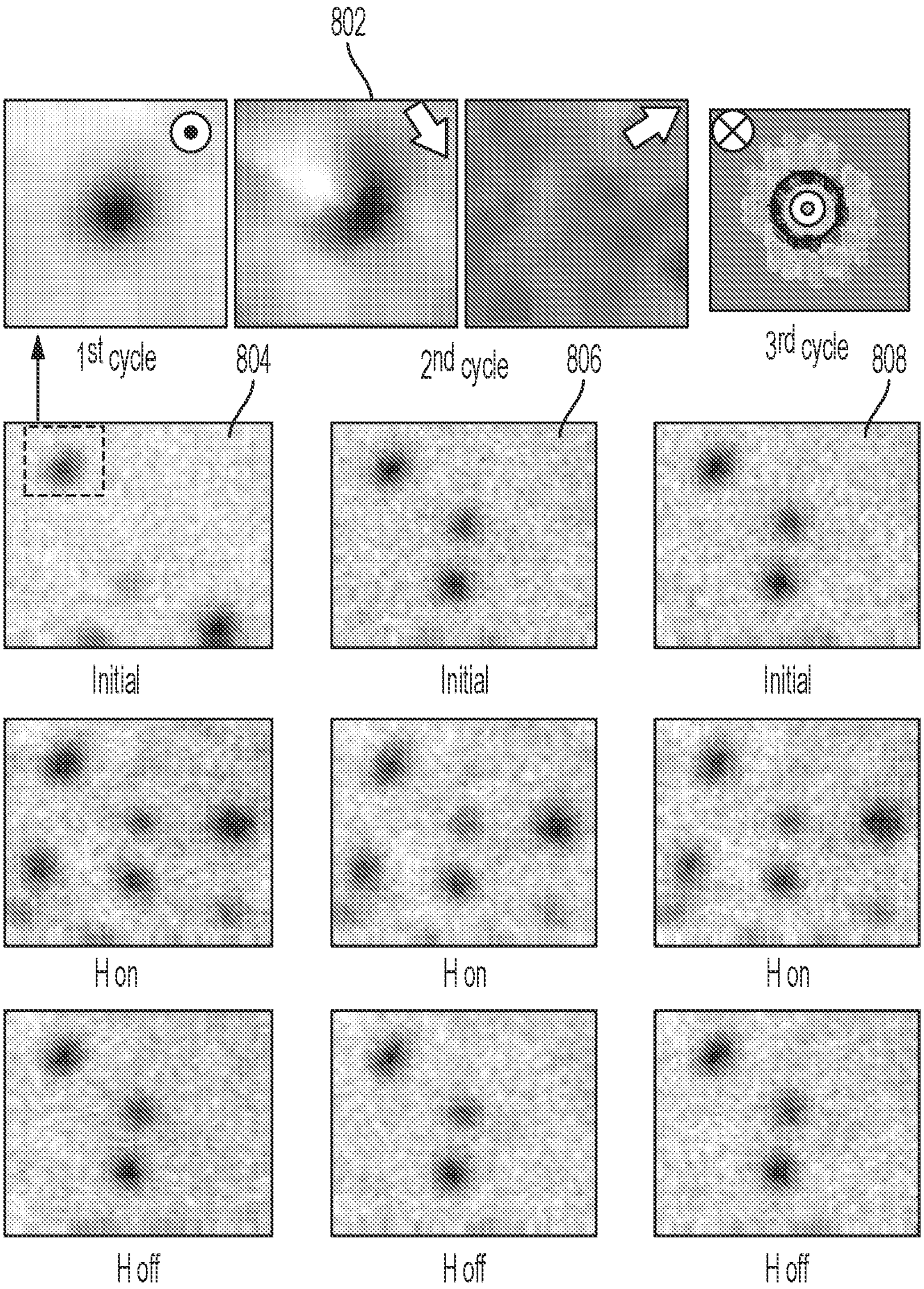
FIG. 8 illustrates an example of reversible writing/deleting of magnetic skyrmions by chemisorption/desorption of hydrogen on Ni/Co/Pd/W surface according to embodiments of the present techniques.

FIG. 8 shows the demonstration of reversible writing/deleting of magnetic skyrmions via chemisorption/desorption of atomic hydrogen in a Ni(0.5 ML)/Co(3 ML)/Pd(6 ML)/W(110) sample. The spin structure of a skyrmion is directly observed using SPLEEM (802), where the three images represent out-of-plane component $M_z$ and two in-plane orthogonal components, confirming the chiral feature of the skyrmion, with spins at the boundary point from $-M_z$ (surrounding region) to +Mz (skyrmion core). The real-time SPLEEM image sequence highlighting $M_z$ component is taken over the region where the skyrmion is observed, as shown in 804. The creation of skyrmions is captured after hydrogen exposure (H on state in 804), and the annihilation of skyrmions is observed (H off state in 804). Here the H on/off cycle is on(3 min)/off(30 min), and 0.9 Langmuir hydrogen is introduced during each H on state (see details in Methods). The same creation/annihilation of skyrmions is observed in additional H on(3 min)/off(30 min) cycles (2nd cycle: 806, 3rd cycle: 808), showing the reversibility of creation/annihilation of skyrmions. The change of magnetic structures in such hydrogen on/off cycles is due to the change of the effective magnetic anisotropy induced by the hydrogen chemisorption/desorption. We attribute the non-reversibility of a skyrmion in the middle of the image to the partial desorption of hydrogen described in FIG. 5, 508, and the related discussion. We demonstrate that hydrogen chemisorption is a new way to write/delete skyrmions, without using magnetic field/electric current or electric voltage.

Significant Dzyaloshinskii-Moriya Interaction and Perpendicular Magnetic Anisotropy Induced by Chemisorbed Organic Molecules Similar chemisorption processes could also lead to induced perpendicular magnetic anisotropy (PMA). PMA refers to the preference of a magnetic thin film to have its magnetic moment oriented normal to the film plane, instead of being in the plane of the film. This property is important in modern nanomagnetic devices such as magnetic recording media and magnetic memory and logic devices. PMA is usually achieved via interface magnetic anisotropy in magnetic multilayer thin films. The invention reported herein offers a new route using chemisorption to induce PMA.

The chemisorption of materials on the surface of magnetic materials can be realized by growing organic molecules on Ni(111) surface. To test the possible interface effect induced by organic molecules, we chose 2,9-dimethyl-4,7-diphenyl-1,10-phenanthroline, also known as bathocuproine (BCP), which can be chemisorbed on the surface of metal films such as Magnesium. We have deposited BCP on the surface of Ni/Co/Pd/W, where the layer-by-layer growth associated LEEM oscillation allows the calibration of BCP layer thickness. The BCP growth can also be evident by the work function shift from ~5.3 eV on 8 ML Ni/W(110) to ~3.8 eV on 1 ML BCP/8 ML Ni/W(110).

Figure 9:
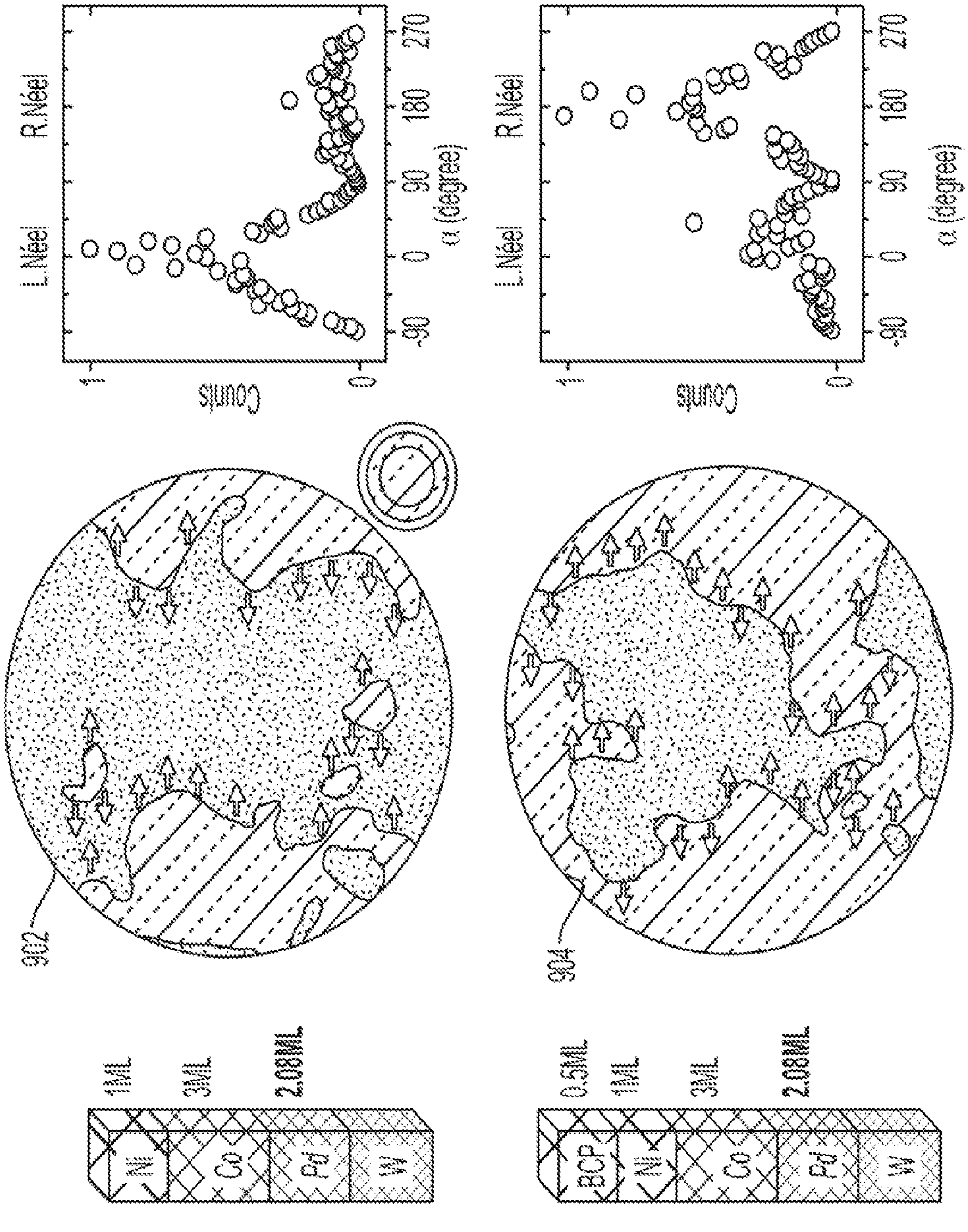
FIG. 9 illustrates an example of SPLEEM observation of BCP induced magnetic chirality switching according to embodiments of the present techniques.

FIG. 9 illustrates an example of SPLEEM observation of BCP induced magnetic chirality switching. A compound SPLEEM image and histogram of domain structure of a perpendicularly magnetized Ni/Co bilayer on Pd/W(110) is shown in 902. Grey/black area indicates “down”/“up” domain, and colorized boundary indicates the in-plane direction of the magnetization within domain walls. The field of view of SPLEEM images is 10 μm. Histograms of angle α between DW magnetization m and DW normal vector n, measured pixel-by-pixel along DW centreline, show the left-handed Néel-type chirality. A compound SPLEEM image and histogram 904 is shown of the same sample shown in 902 with additional 0.5 ML BCP.

We first study the possible DMI induced by the chemisorbed BCP layer. We find that the presence of half monolayer BCP can switch the magnetic chirality of domain walls in Ni/Co/Pd/W from left-handed Néel type (902) to right-handed Néel type (904), indicating a significant DMI induced at BCP/Ni interface that favors right-handed chirality. We find that the DMI change due to 1 ML BCP on Ni/Co/Pd/W is roughly equal to the DMI change of 0.1 ML Pd in Ni/Co/Pd/W, which indicates that the DMI at BCP/Ni is ~18 times smaller than the DMI at the O/Ni interface (see section discussing how to quantitatively extract the strengths of these DMI contributions above and FIG. 3), therefore one could get $D_{BCP/Ni}$=0.12±0.01 meV/atom. Note that the zero-DMI thickness of Pd (~2.05 ML Pd) is different from the O-DMI case possibly due to the different tungsten crystal.

Figure 10:
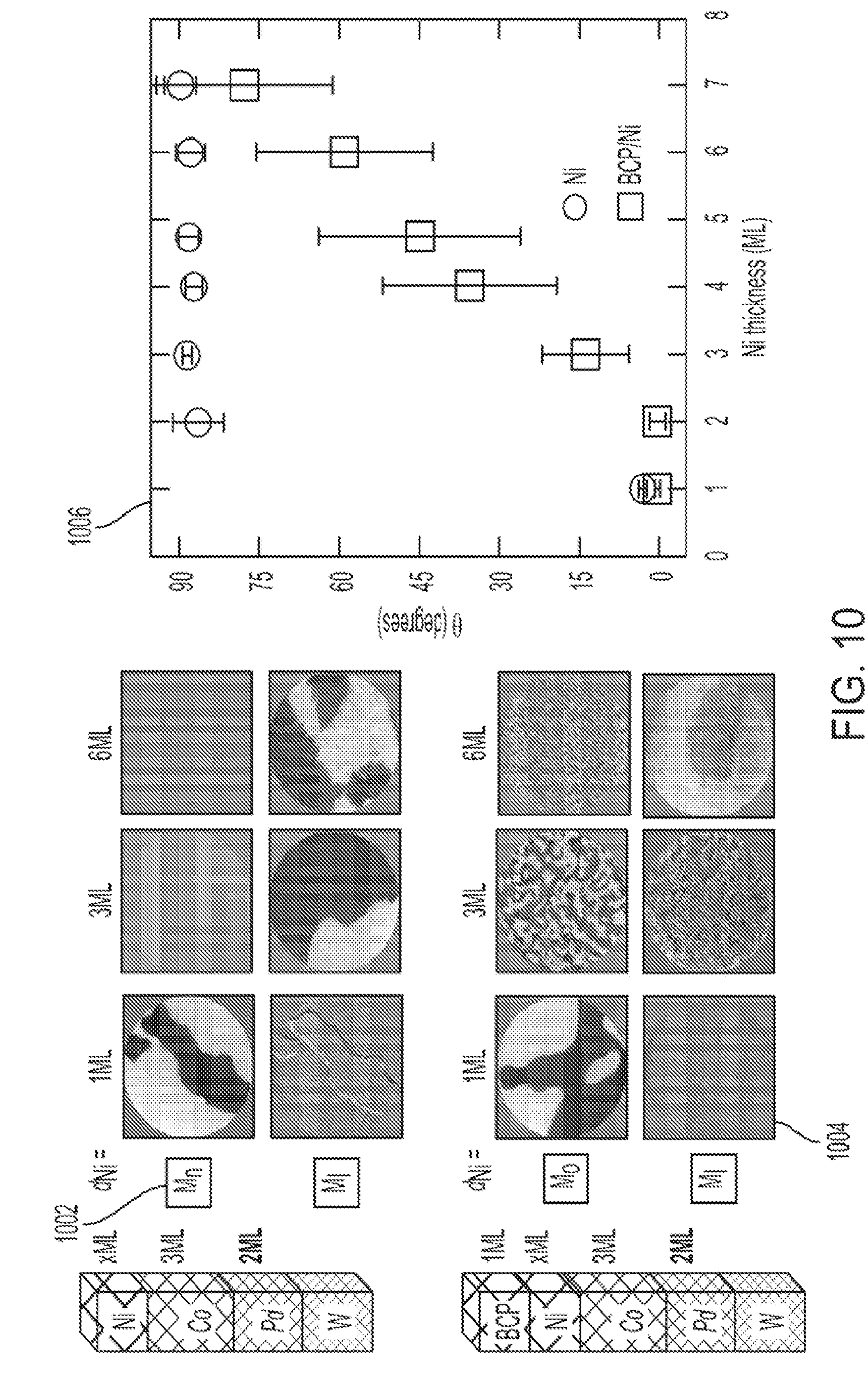
FIG. 10 illustrates an example of SPLEEM observation of BCP induced enhancement of PMA according to embodiments of the present techniques.

We further test the role of BCP on PMA, by measuring the difference of critical ferromagnetic layer thickness at the spin reorientation transition (SRT). This approach has been used to explore the role of PMA at a given interface, such as graphene/Co. FIG. 10 illustrates an example of SPLEEM observation of BCP induced enhancement of PMA. A Ni-thickness dependent domain structure of Ni(xML)/Co(3 ML)/Pd(2 ML)/W(110) is shown in 1002, where the spin reorientation transition occurs between 1 and 2 ML Ni thickness. The contrast indicates the magnetization along the out-of-plane direction ($M_\perp$ upper row) and in-plane direction ($M_{||}$ upper row). The field of view of SPLEEM images is 10 μm. A Ni-thickness dependent domain structure of BCP(1 ML)Ni(xML)/Co(3 ML)/Pd(2 ML)/W(110) is shown in 904. A Ni-thickness dependent angle θ is shown in 1006, where θ is defined as averaged angle of magnetization within domains with respect to surface normal direction. The SRT shift due to the presence of BCP layer indicates a significant PMA induced at BCP/Ni interface.

In the present Ni/Co/Pd/W system, we have investigated Ni thickness-dependent domain structures, and found that the SRT occurs at thicker Ni film thickness in the Ni/Co/Pd/W system with BCP overlayer (1004), in contrast to the bare Ni/Co/Pd/W case (1002). This observation demonstrates the existence of induced PMA at the BCP/Ni interface.

The significant DMI and PMA induced by BCP may bring exciting opportunities for designing magnetic multilayer structures without heavy metals. Because BCP can be prepared on magnetic films at room temperature, and it is very different from the graphene case where the sample has to be annealed to at least 400-500° C. for the graphene growth, which may likely destroy the magnetic multilayers. Moreover, BCP is one of the most-common materials used between acceptor and electrode in organic photovoltaic cell, and BCP has been used to achieve air-stable BCP-based spin valves at room temperature, which may trigger the design of novel functionality of devices. For example, BCP may allow the combination of skyrmions and spin valves, as PMA could greatly enhance the performance of magnetic tunnel junction.

Discussions and Device Applications

The DMI induced by materials with strong spin-orbit coupling based on the Fert-Levy model has been experimentally observed at many interfaces between ferromagnets and heavy metals. The charge transfer and hybridization are expected to generally occur at interfaces between ferromagnets and the chemisorbed species. Although the induced DMI and PMA, the writing of magnetic skyrmions and switching of domain wall chirality due to the change of the effective DMI are demonstrated in specific systems (chemisorbed $O_2$, $H_2$ and bathocuproine) in this work, these effects may be generally applicable in other systems, including $N_2$, $F_2$, $NH_3$, $H_2O$, $CH_3$, $CH_4$, CO, $CO_2$, fullerene ($C_{60}$ and $C_{70}$), organic molecules (Tris(8-hydroxyquinoline)aluminum(III), TMTES-Pentacene, Rubrene $C_{42}H_{28}$, B2PymPm), carbon nanotubes, carbon nanoribbons, and their ionic species such as $O^{2-}$, $H^+$, $N^{3-}$, $F^-$ and $OH^-$ as layers that provide the DMI, and fullerene ($C_{60}$ and $C_{70}$), organic molecules (Tris(8-hydroxyquinoline)aluminum(III), TMTES-Pentacene, Rubrene $C_{42}H_{28}$, B2PymPm), carbon nanotubes, carbon nanoribbons as layers that provide the PMA. The choice of solid layers could be selected from transition metals, alkali metals, and lanthanides, including but not limited to Manganese, Iron, Cobalt, Nickel, Molybdenum, Ruthenium, Rhodium, Palladium, Cesium, Hafnium, Tantalum, Tungsten, Rhenium, Iridium, Platinum, Gadolinium, Terbium, Dysprosium, Holmium and their alloys, or selected from a group of other non-metallic materials, including but not limited to ferrites, garnets, rare-earth oxides, Heusler alloys, $CrO_2$, graphene, $CrI_3$, and $Cr_2Ge_2Te_6$.

The sign change of the DMI due to the chemisorbed species effectively triggers the chirality switching of domain walls or skyrmions, as shown in FIGS. 2,4 (oxygen), FIGS. 6,7 (hydrogen), and FIG. 9 (BCP). It is well known that the direction of electric-current-driven domain wall/skyrmion propagations depends on the chirality of the spin texture, therefore controlling the sign of the DMI and subsequently the magnetic chirality via chemisorption introduces a new way to control the direction of current-driven domain wall /skyrmion propagation. On the other hand, the sign change of the DMI and switching of magnetic chirality via chemisorption species can be utilized as an effective way to switch the magnetization by 180°, in case if domains/domain walls are pinned, the DMI/chirality change would switch the magnetization in domain walls/domains by 180°, respectively. Therefore, the magnetic chirality and 180° magnetization switching via chemisorption-induced DMI can potentially be used in spintronics memory/logic devices or gas sensors.

Figure 11:
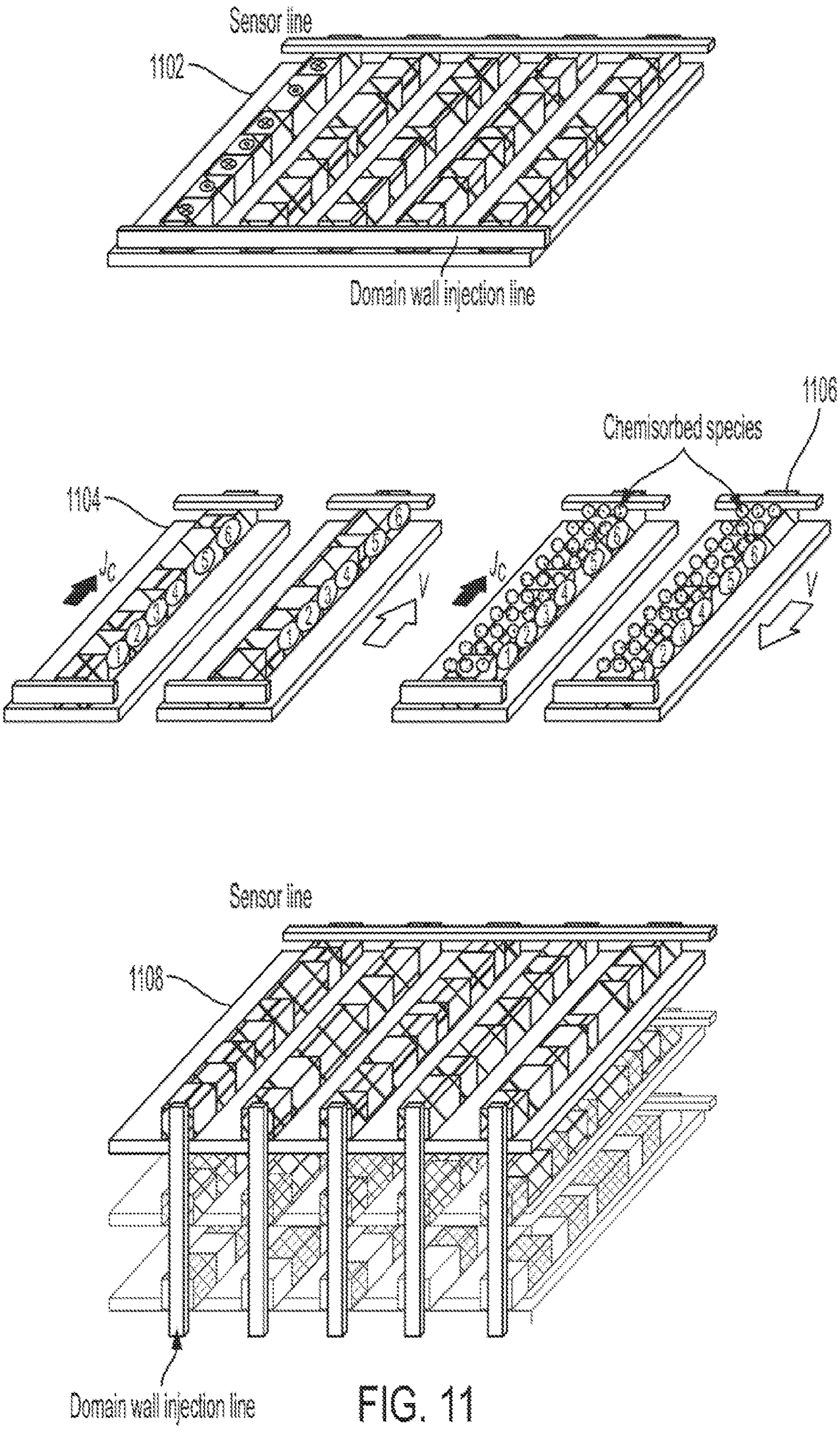
FIG. 11 illustrates examples of "racetrack" memory structure (1102), control of propagation direction (v) of domain walls via electric current ($J_c$) (1104) or chemisorbed species (1106). A 3D version of the racetrack memory is illustrated in 1108.

For example, the sensitive and reversible switching of the DMI and chiral spin texture via chemisorption is highly relevant for chiral spintronics, such as "racetrack" type of magnetic memories [see Parkin et al, Science 320, 190-194 (2008)] where the magnetic state is stored in domain walls or skyrmions propagating along a track, as shown in 1102 of FIG. 11. In one embodiment, upon the application of an electric current ($J_c$), the domain walls or skyrmions are set in motion, as indicated by the velocity (v) direction in 1104. The chemisorption species may be used to manipulate the chiral domain wall motion by controlling the chirality, e.g., leading to motion in the opposite direction when the chirality is reversed (shown in 1106). In another embodiment the chemisorption species may be used to sensitively control the skyrmion size over large size ranges. One key advantage is that the switching via chemisorption may be done in a tunable and contactless fashion, without requiring electrical leads being attached to the device. This is particularly attractive for complex device geometries such as the envisioned 3-dimensional (racetrack) memory which extends the original 1-dimensional track into a complex 3-dimensional array (1108) [Parkin and Yang, Nature Nanotech. 10, 195 (2015)] with numerous domain walls or skyrmions. The corresponding changes in their magneto-transport properties, such as magnetoresistance readout, may be used for magnetic memory and logic devices as well as memristors.

Another example is for gas-sensing, as the chemisorption induced effects are extremely sensitive to trace amount of chemisorbed species, down to a fraction of a monolayer of atoms. By measuring the spin texture change caused by exposure to certain gases such as oxygen or hydrogen, e.g., switching of perpendicular magnetization in-plane or vice versa, or toggling of the domain wall chirality, or manipulation of magnetic skyrmions, which can be read out electrically through the aforementioned magnetic memory and logic devices, e.g., via magnetoresistance response, one can sensitively detect the presence of these gases. Given the differences in the induced effect sizes, e.g., oxygen induced DMI is more than an order of magnitude larger than that induced by hydrogen, one can differentiate different gases, yielding gas selectivity. Such gas sensing capabilities may have large economic importance in various commercial applications including hydrogen-based energy storage and energy conversion systems. For example, in such energy applications hydrogen gas and oxygen gas coming into unintended contact may cause combustion or explosion risks, therefore prevention of such risks necessitates sensors capable to detect oxygen contamination in hydrogen vessels and vice-versa.

These chemisorption-based results are also relevant to the emerging field of magneto-ionics, which uses ionic motion across magnetic heterostructure interfaces to transform those interfaces and their physical and chemical properties.

They not only significantly expand on the magnetic functionalities that can be controlled magneto-ionically, but also offer exciting potentials for completely reversible and energy-efficient switching. So far much of the progress has been based on oxygen ions and vacancies. Tan et al. have demonstrated $H^+$-based reversible magneto-ionic switching at room temperature where electric field-controlled hydrogenation at the buried Co/GdO interface is used to toggle the perpendicular magnetic anisotropy (PMA) [Nature Materials 18, 35 (2019)]. Hydrogen based magneto-ionics is particularly appealing, comparing to mostly oxygen-based systems studied so far, due to the superior reversibility and speed. However, besides PMA, other hydrogen-induced magneto-ionic functionalities remain largely unexplored.

Figure 12:
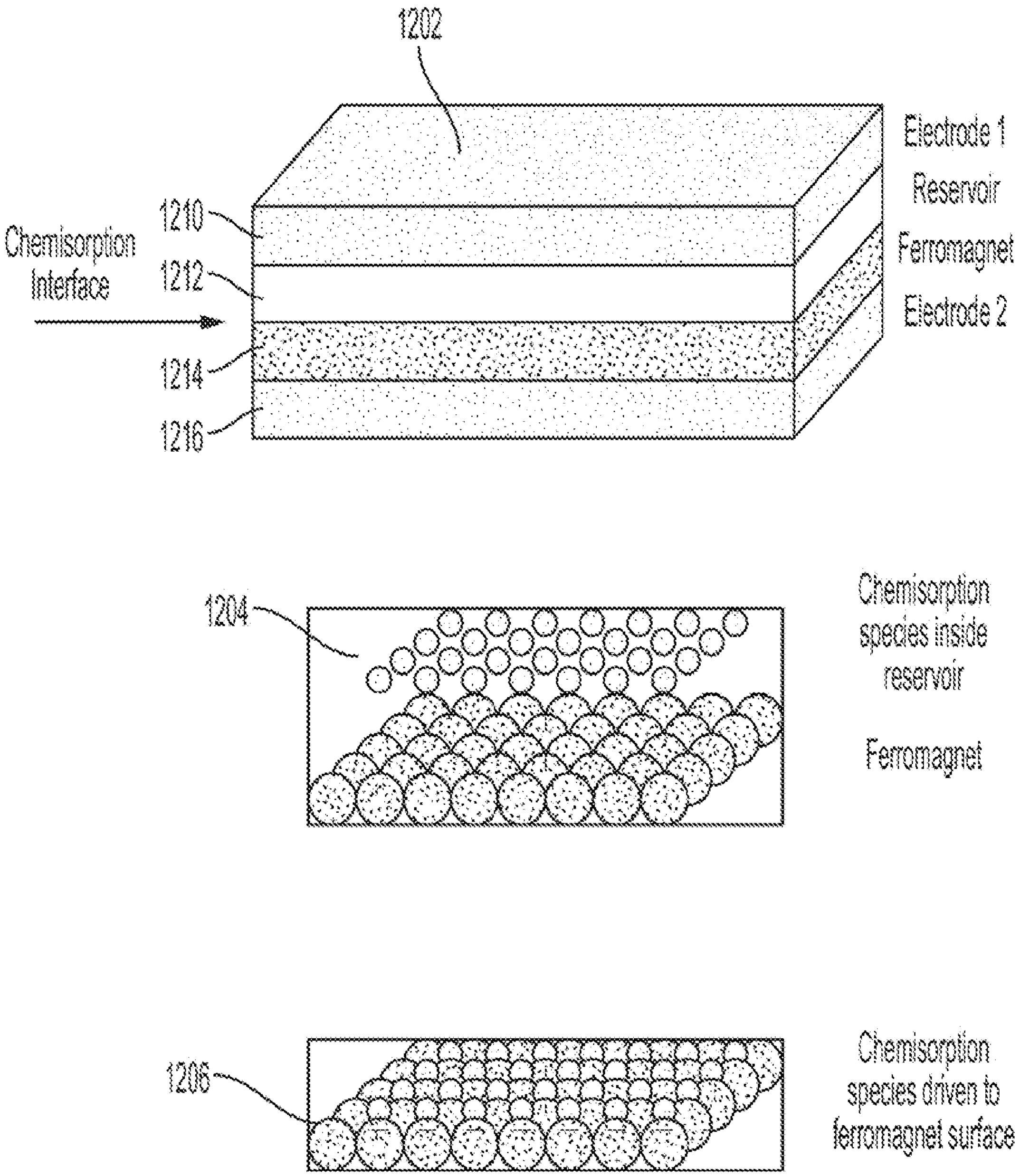
FIG. 12 illustrates an example of chemisorption occurring at buried interfaces of a multilayer structure, where the chemisorption species initially are stored inside a reservoir layer and later driven to the ferromagnet surface.

Embodiments may be used in multilayer heterostructures, where the chemisorption onto ferromagnet surface takes place under buried interfaces, as illustrated in 1202 of FIG. 12. In this example, device 1202 may include electrode 1 1210, a reservoir layer 1212, a ferromagnet layer 1214, and electrode 2 1216. For example, oxygen, hydrogen or other species may be stored in a reservoir layer 1212, in atomic, ionic, or compound form, as shown in 1204. They are subsequently driven into contact with the surface of a ferromagnet 1214, as shown at 1206, for example, by applying appropriate voltage between electrodes 1 and 2 1210, 1216 using appropriate circuitry, where the chemisorption may occur. In one embodiment, the reservoir layer 1212 is insulating and contains ions of the chemisorption species, such as various oxides as source of oxygen ion, various hydroxides (e.g., cobalt or gadolinium hydroxide) as source of hydrogen ion, and various nitrides as source of nitrogen ion; the ferromagnet layer 1214 is electrically connected to electrode 2 and both are grounded; electrode 1 is positively biased by an applied voltage relative to the ground to drive positive ions of the chemisorption species (such as $H^+$), or negatively biased relative to the ground to drive negative ions of the chemisorption species (such as $O^{2-}$, $N^{3-}$ or $F^-$), inside the insulating reservoir layer into contact with the ferromagnet layer1214. Since the ferromagnet layer 1214 is grounded, the ions will be reduced to atomic form (e.g., H, O, N or F) upon contact and trigger chemisorption at the ferromagnet surface. Subsequently, the electrodes 1 and 2 may be electrically shorted to ionize the neutral chemisorption species and drive them off of the ferromagnet 1214 surface. In another embodiment, the chemisorption species may be stored in the reservoir layer 1212 in atomic, molecular, or compound form. For example, hydrogen may be stored in a layer made of platinum (Pt) or palladium (Pd), and released upon heating, and arriving at the ferromagnet 1214 surface to trigger chemisorption, as illustrated in 1206. It would be particularly attractive to reversibly control the interfacial DMI, and in turn magnetic chirality and spin textures, via chemisorption, especially given the high mobility of hydrogen in solids. The switching of domain wall chirality could influence chiral domain wall motion. This is useful for magnetic memory and logic devices, such as the "racetrack" type of magnetic memories mentioned earlier (FIG. 11), as well as artificial synapses. This effect may also be used to control other spin textures, such as creation of magnetic skyrmions, changing domain wall type of skyrmions or varying the size of skyrmions.

Summary

In summary, our experiments demonstrate significant DMI and PMA induced by chemisorbed species on ferromagnet films. We show that the DMI induced at an oxygen/Ni interface is comparable to that induced at interfaces with most heavy metals. We find this large chemisorbed oxygen induced DMI can be used to write magnetic skyrmions. We also show that a tuneable DMI systems such as the Pd/W (110) system employed here open up a useful and broadly applicable way to quantify the magnitude of the DMI in thin film systems. We show that the DMI induced at a hydrogen/Ni interface allows sensitive and reversible switching of domain wall chirality in Ni/Co/Pd/W system. We anticipate that significant DMI may also be induced by chemisorbed oxygen, hydrogen, or other species on other magnetic surfaces such as chromium, manganese, iron or cobalt. The observation of the significant DMI and PMA induced by chemisorbed species, along with the possibility of voltage-controlled ionic migration in multilayer systems, may create new possibilities in the field of spintronics and magneto-ionics.

Methods

Sample preparation. The experiments were conducted in the SPLEEM instrument at the National Center for Electron Microscopy of Lawrence Berkeley National Laboratory. All samples were prepared under ultra-high vacuum conditions in the SPLEEM chamber, with a base pressure better than $4.0\times10^{-11}$ torr. The W(110) substrate was cleaned by flashing to 1,950° C. in $3.0\times10^{-8}$ torr $O_2$, and final annealing at the same temperature under ultrahigh vacuum to remove oxygen. Ni, Co and Pd layers were deposited at room temperature by physical vapour deposition from electron beam evaporators, and the film thicknesses of Ni, Co and Pd layers were controlled by monitoring the LEEM image intensity oscillations associated with atomic layer-by-layer growth.

Oxygen exposures were done by controlled leaking of high-purity oxygen at pressure in the range of $5\times10^{-9}$ torr to $1\times10^{-8}$ torr, and the surface contaminations from other residual gases (base pressure $<4\times10^{-11}$ torr) is estimated to be at least two order of magnitude less, which is insufficient to influence the result. The oxygen coverage is estimated based on the kinetics relation previously reported in by Kortan and Park [Phys. Rev. B 23, 6340 (1981)], and our measurements of oxygen-coverage dependent work function change as well as the low-energy electron diffraction pattern shows excellent agreement with the previous measurement. The low-energy electron diffraction pattern is taken at total dose of 2L on the surface of 1 ML Ni/3 ML Co/2.5 ML Pd/W(110) system, at electron energy of 80 eV.

Hydrogen exposures were realized by leaking of high-purity hydrogen (99.999%) at a pressure of at $5\times10^{-9}$ torr. The pressure of hydrogen reading of the ionization gauge has been corrected by a factor of 0.46. No noticeable change was observed in the LEED pattern upon hydrogen chemisorption at room temperature. On Ni(111), the maximum work function shift occurs at the hydrogen coverage of 0.5-0.6 ML , and volumetric measurements reveals that the saturation coverage of chemisorbed hydrogen on Ni(111) is ~0.7 ML at room temperature. Therefore, the hydrogen coverage on the surface of Ni/Co/Pd/W(110) is estimated based on the work function shift measurement with a maximum work function shift ($\Delta\varphi$=125 meV), which roughly corresponds to 0.5-0.7 ML hydrogen overlayer.

Time-Dependent Work Function Measurement

The work function is determined by fitting the LEEM IV spectrum (image intensity vs incident energy of electrons, see 502) with a complementary error function erfc (Start voltage). The value where the drop-off occurs, $$V_S^0,$$

represents a measurement of the sample work function given by $$\phi_{sample} = V_S^0 + E_C^0,$$

where $$E_C^0$$

represents the peak of the electron distribution emitted from our photocathode (p-type GaAs crystal activated with CsO). The emission of the GaAs cathode of SPLEEM is set to 100 nA to optimize the energy spread to about 180 meV (full width at half maximum) and $$E_C^0 \sim 1.4 - 1.5 \text{ eV}$$

measuring a reference surface such as Highly Oriented Pyrolytic Graphite (HOPG). Time-dependent work function measurements were performed by recording the reflectivity of low energy electrons while sweeping the start voltage in a loop. In order to record the work function changes during hydrogen adsorption/desorption at the surface, the start voltage was swept from 1.5 V below to about 2 V above the intensity drop-off using 50 mV voltage steps and an image integration time of 250 ms. Relative changes in the work function over time can be detected with very-high sensitivity down to about 5 mV given by the shift of the centroid of the gaussian distribution extracted by the erfc (Start voltage) fitting.

Time-dependent in-plane domain wall analysis Due to the noise present in the individual in-plane domain wall images, we used standard image denoising methods to provide a more accurate estimate for the magnetization presented in FIG. 7. The measured images were denoised by 3D total variational denoising (3D-TVD), using a Matlab implementation and 3D extension to the methods given in Jia and Zhao. After normalizing the data to have a mean intensity of zero and a standard deviation of one, we used regularization parameters of \mu =[2 2 1] and \lambda =[⅛ ⅛ 1⁄16] for the dimensions of x,y and time respectively. FISTA acceleration was used to speed convergence. The regularization was applied isotropically to the x and y directions. After the TVD was applied, we normalized the images to have a mean of zero and the boundary contrast to have an approximate range of −1 to +1.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for generating a Dzyaloshinskii-Moriya interaction or a perpendicular magnetic anisotropy comprising:

a thin film ferromagnetic structure; and a substance chemisorbed on a surface of the thin film ferromagnetic structure, wherein the chemisorption of the substance on the surface of the thin film ferromagnetic structure forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure, wherein the Dzyaloshinskii-Moriya interaction or the perpendicular magnetic anisotropy is controlled based on a thickness of at least one layer of the thin film ferromagnetic structure.

2. An apparatus for generating a Dzyaloshinskii-Moriya interaction or a perpendicular magnetic anisotropy comprising:

a thin film ferromagnetic structure; and a substance chemisorbed on a surface of the thin film ferromagnetic structure, wherein the chemisorption of the substance on the surface of the thin film ferromagnetic structure forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure, wherein the substance chemisorbed on the surface of the thin film ferromagnetic structure is selected from a group comprising $O_2$, $H_2$, $N_2$, $F_2$, $NH_3$, $H_2O$, $CH_3$, $CH_4$, CO, $CO_2$, fullerene ($C_{60}$ and $C_{70}$), bathocuproine, Tris (8-hydroxyquinoline) aluminum (III), and their ionic species such as $O^{2-}$, $H^+$, $N^{3-}$, $F^-$ and $OH^-$.

3. An apparatus for generating a Dzyaloshinskii-Moriya interaction or a perpendicular magnetic anisotropy comprising:

a thin film ferromagnetic structure; and a substance chemisorbed on a surface of the thin film ferromagnetic structure, wherein the chemisorption of the substance on the surface of the thin film ferromagnetic structure forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure, wherein changing a coverage of the surface by the chemisorbed substance changes the Dzyaloshinskii-Moriya interaction or the perpendicular magnetic anisotropy of the apparatus and thereby changes a magnetic domain wall chirality or a skyrmion size.

4. An apparatus for generating a Dzyaloshinskii-Moriya interaction or a perpendicular magnetic anisotropy comprising:

a thin film ferromagnetic structure; and a substance chemisorbed on a surface of the thin film ferromagnetic structure, wherein the chemisorption of the substance on the surface of the thin film ferromagnetic structure forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure, wherein monitoring the chemisorption-induced Dzyaloshinskii-Moriya interaction is used as a gas sensor detecting presence of gases including at least one of $O_2$, $H_2$, $N_2$, $F_2$, or $NH_3$.

5. An apparatus for generating a Dzyaloshinskii-Moriya interaction or a perpendicular magnetic anisotropy comprising:

a thin film ferromagnetic structure; and a substance chemisorbed on a surface of the thin film ferromagnetic structure. wherein the chemisorption of the substance on the surface of the thin film ferromagnetic structure forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure, wherein the Dzyaloshinskii-Moriya interaction is controlled so as to move a domain wall or skyrmion in a racetrack memory, including a three dimensional racetrack memory, by changing a coverage of the chemisorbed substance.

6. An apparatus for generating a Dzyaloshinskii-Moriya interaction or a perpendicular magnetic anisotropy comprising:

a thin film ferromagnetic structure;

a reservoir containing a substance; and circuitry configured to drive at least some of the substance from the reservoir to the surface of the thin film ferromagnetic structure so as to cause chemisorption of the substance on the surface of the thin film ferromagnetic structure, wherein the chemisorption of the substance on the thin film ferromagnetic structure surface forms chemisorption bonds between the substance and the thin film ferromagnetic structure surface, wherein the chemisorption bonds induce the Dzyaloshinskii-Moriya interaction or the perpendicular magnetic anisotropy at an interface between the chemisorbed substance and the thin film ferromagnetic structure.

7. The apparatus of claim 6, wherein the reservoir is insulating and contains ions of the substance to be chemisorbed.

8. The apparatus of claim 6, wherein the reservoir comprises a metal and the stored substance is hydrogen and the circuitry comprises a heater for driving the hydrogen out of the reservoir.

* * * * *